(12) United States Patent
Volodin et al.

(10) Patent No.: US 7,031,573 B2
(45) Date of Patent: Apr. 18, 2006

(54) FIBER OPTIC DEVICES HAVING VOLUME BRAGG GRATING ELEMENTS

(75) Inventors: Boris L. Volodin, West Windsor, NJ (US); Vladimir Sinisa Ban, Princeton, NJ (US)

(73) Assignee: PD-LD, Inc., Pennington, NJ (US)

( * ) Notice: Subject to any disclaimer, the term of this patent is extended or adjusted under 35 U.S.C. 154(b) by 0 days.

(21) Appl. No.: 11/173,914

(22) Filed: Jul. 1, 2005

(65) Prior Publication Data

US 2005/0244102 A1    Nov. 3, 2005

Related U.S. Application Data

(62) Division of application No. 10/390,521, filed on Mar. 17, 2003.

(60) Provisional application No. 60/365,032, filed on Mar. 15, 2002.

(51) Int. Cl.
    *G02B 6/34* (2006.01)
(52) U.S. Cl. .............. 385/37; 359/15; 359/16
(58) Field of Classification Search ............... 359/15, 359/16; 385/37
    See application file for complete search history.

(56) References Cited

U.S. PATENT DOCUMENTS

| | | | |
|---|---|---|---|
| 4,013,388 A | 3/1977 | Stratman | 350/3.5 |
| 4,057,408 A | 11/1977 | Pierson et al. | 65/18 |
| 4,095,875 A | 6/1978 | Lee et al. | 350/320 |
| 4,514,053 A | 4/1985 | Borrelli et al. | 350/162.2 |
| 4,942,102 A | 7/1990 | Keys et al. | 430/1 |
| 5,115,338 A | 5/1992 | DiGiovanni et al. | 359/337 |
| 5,335,098 A | 8/1994 | Leyva et al. | 359/7 |
| 5,440,669 A | 8/1995 | Rakuljic et al. | 359/7 |
| 5,491,570 A | 2/1996 | Rakuljic et al. | 359/7 |
| 5,684,611 A | 11/1997 | Rakuljic et al. | 359/7 |
| 5,691,989 A | 11/1997 | Rakuljic et al. | 372/20 |
| 5,777,763 A | 7/1998 | Tomlinson, III | 359/130 |
| 5,796,096 A | 8/1998 | Rakuljic et al. | 250/226 |
| 5,798,859 A | 8/1998 | Colbourne et al. | 359/247 |
| 5,825,792 A | 10/1998 | Villeneuve et al. | 372/32 |
| 6,198,759 B1 | 3/2001 | Broderick et al. | 372/39 |
| 6,269,203 B1 | 7/2001 | Davies et al. | 385/24 |
| 6,385,219 B1 | 5/2002 | Sonoda | 372/28 |
| 6,414,973 B1 | 7/2002 | Hwu et al. | 372/19 |
| 6,529,675 B1 | 3/2003 | Hayden et al. | 385/141 |
| 6,586,141 B1 * | 7/2003 | Efimov et al. | 430/1 |

(Continued)

FOREIGN PATENT DOCUMENTS

EP    0 310 438 A1    4/1989

(Continued)

OTHER PUBLICATIONS

Borgman, V.A., et al., "Photothermal refractive effect in silicate glasses," *Sov. Phys. Dokl.*, Nov. 1989, 1011-1013.

(Continued)

*Primary Examiner*—Nikita Wells
*Assistant Examiner*—David A. Vanore
(74) *Attorney, Agent, or Firm*—Woodcock Washburn LLP

(57) ABSTRACT

Fiber optic devices including volume Bragg grating (VBG) elements are disclosed. A fiber optic device may include one or more optical inputs, one or more VBG elements, and one or more optical receivers. Methods for manufacturing VBG elements and for controlling filter response are also disclosed. A VBG chip, and fiber optic devices using such a chip, are also provided. A VBG chip includes a monolithic glass structure onto which a plurality of VBGs have been recorded.

7 Claims, 18 Drawing Sheets

U.S. PATENT DOCUMENTS

| | | |
|---|---|---|
| 6,673,497 B1 * | 1/2004 | Efimov et al. ............... 430/1 |
| 6,829,067 B1 | 12/2004 | Psaltis et al. ............... 359/15 |
| 2001/0016099 A1 | 8/2001 | Shin et al. ............... 385/37 |
| 2001/0028483 A1 | 10/2001 | Buse ............... 359/15 |
| 2002/0045104 A1 | 4/2002 | Efimov et al. ............... 430/2 |
| 2002/0176126 A1 | 11/2002 | Psaltis et al. ............... 359/15 |
| 2003/0214700 A1 | 11/2003 | Sidorin et al. ............... 359/334 |

FOREIGN PATENT DOCUMENTS

| | | |
|---|---|---|
| EP | 0 322 218 A3 | 6/1989 |
| SU | 178-429 A1 | 11/1990 |

OTHER PUBLICATIONS

Borrelli, N.F., et al., "Photosensitive glasses and glass-ceramics," *Glass Processing*, 439-444.

Churin, E.G., et al., "Design of free-space WDM router based holographic concave grating," *IEEE Photonics Techn. Letts.*, Feb. 1999, 11(2), 221-223.

Efimov, O.M., et al., "High-efficiency bragg gratings in photothermorefractive glass," *Applied Optics*, Feb. 1, 1999, 38(4), 619-627.

Glebov, L.B., et al., "Pholychromic glasses—a new material for recording volume phase holograms," *Sov. Phys. Dokl.*, Oct. 1990, 35(10), 878-880.

Glebov, L.B., et al., "High-efficiency volume hologram recording in silicate glass," *School of Optics and CREOL*, University of Central Florida, Orlando, FL, 16 pages.

Glebov, L.B., et al., "Photosensitive glass for phase hologram recording," *Glass Science and Technology*, 1998, 71 C, 85-90.

Hendow, S.T., "Crystal bragg gratings stabilize laser sources," *Laser Focus World*, Nov. 1996, S19-S24.

Kogelnik, H., et al., "Coupled wave theory for thick hologram gratings," *The Bell System Technical Journal*, Nov. 1969, 48(9), 2909-2947.

Liu, J., et al., "Modeling and design of planar slanted volume holographic gratings for wavelength-division-multiplexing applications," *Applied Optics*, Dec. 1, 1999, 6981-6986.

Moslehi, B., et al., "Fiber-optic wavelength-division multiplexing and demultiplexing using volume holographic gratings," *Optic Letters*, Oct. 1, 1989, 1088-1090.

Qiao, J., et al., "Dispersion-enhanced volume hologram for dense wavelength-division demultiplexer," *IEEE Photonics Technology Letts.*, Aug. 2000, 12(8), 1070-1072.

Rakuljic, G.A., et al., "Volume holographic narrow-band optical filter," *Optical Engineering*, Oct. 1997, 36(10), 459-461.

Sayano, K., "Holographic grating filters in optical glasses for C31 WDM networks," *Accuwave Corp., sponsored by Ballistic Missile Defense Organization*, May 1998, AFRL-SN-RS-TR-1998-81, Final Technical Report, 1-35, DL-1-DL-3.

Timofeev, F.N., et al., "Free-space grating multi/demultiplexer and wavelength-router for densely spaced WDM networks," *IEE*, Nov. 1-5, 1997, 372-373.

Zhao, F., et al., "Reliable grating-based wavelength division (de)multiplexers for optical networks," *Opt. Eng.*, Jul. 2001, 40(7), 1204-1211.

Zhao, F., et al., "Subpicometer accuracy laser wavelength sensor using multiplexed bragg gratings," *IEEE Photonics Technology Letts.*, Nov. 1997, 9(11), 1493-1495.

Zhao, F., et al., "Ultraviolet Ca K-line narrow-bandwidth imaging filters based on holographic Bragg gratings in photorefractive materials," *Opt. Eng.*, Oct. 1997, 36(10), 2918-2921.

Breer, S. et al., "Low-crosstalk WDM by bragg diffraction from thermally fixed reflection holograms in lithium niobate", *Electronics Letts.*, 1998, 34 (25), 2419-2421.

Dicing Solutions for DWDM Optical Filter Applications; advertising brochure of *ADT Advanced Dicing Technologies*, Stockholm Sweden, 2003, 2 pages.

Optical Interference Filters, 17$^{th}$ Ed., *Spectrogon*, Taby, Sweden, www.spectrogen.com, no date available, 3-21.

Chang-Hasnain, C.J., et al., "High power with high efficiency in a narrow single-lobed beam from a diode laser array in an external cavity," *Appl. Phys. Lett.*, 1987, 50(21), 1465-1467.

Datta, S., et al., "Modeling of nonideal volume Bragg reflection gratings in photosensitive glass using a perturbed transmission matrix approach," *IEEE J. of Quantum Electronics*, 2004, 40(5), 580-590.

Goodman, J.W., "Introduction to fourier optics," *McGraw-Hill Co., Inc.*, 2$^{nd}$ Ed., 1996, 329-330.

Moser, C., et al., "Volume Bragg grating devices," *Friday Morning*, 2003, 2, 644-645.

Sakamoto, M., et al., "20 W CW monolithic AIGaAs (810nm) laser diode arrays," *Electronic Letts.*, 1992, 28(2), 178-180.

Volodin, B.L., et al., "High-resolution compact imaging holographic Bragg grating spectrometer," *CLEO*, 1998, 401-402.

Yiou, S., et al., "Improvement of the spatial beam quality of laser sources with an intracavity Bragg grating," *Optics Letts.*, 2003, 28(4), 242-244.

Dmitriyev, A.L., et al., "Volume holograms in the optical devices of optical-fiber data transmission systems, A review, " *Telecommun. & Radio Eng.*, 1995, 49(12), 9-15.

Sayano, K., et al., "Modular WDM add/drop multiplexers," *SPIE*, 1997, 3234, 102-107.

Applicant calls to the Office's Attention, Application No:. 820/CAL/93, Filed Dec. 28, 1993, Inventors—Victor Leyva and George Rakuljic, "Method for Writing Reflection Mode Gratings in Photoreflective Materials in the Infrared.", and U.S. Appl. No:. 08/842,645, Filed Apr. 15, 1997, Inventors—Koichi Sayano and F. Zhao, "High Resolution Holographic Image and Data Storage System." Applicant has no Further Information Regarding these References.

* cited by examiner

CHAIN CASCADING

LAMINATING

MULTIPATH

FIBER OPTIC DEVICES HAVING VOLUME BRAGG GRATING ELEMENTS

CROSS-REFERENCE TO RELATED APPLICATIONS

This application is a Divisional of U.S. patent application Ser. No. 10/390,521, filed Mar. 17, 2003, entitled "Fiber Optic Devices Having Volume Bragg Grating Elements," which in turn claims benefit under 35 U.S.C. § 119(e) of U.S. Provisional patent application No. 60/365,032, filed Mar. 15, 2002, the disclosure of which is hereby incorporated herein by reference.

FIELD OF THE INVENTION

The invention is related generally to fiber optic devices. In preferred embodiments, the invention provides fiber optic devices having one or more volume Bragg grating (VBG) elements, and methods for making such VBG elements.

BACKGROUND OF THE INVENTION

Light wavelength selectivity of thick periodic structures was, historically, studied first in x-ray diffraction on crystalline solids. It was recognized that such selectivity arises due to the coherent addition of the light energy diffracted by individual layers forming precisely spaced stacks, such as that of the atomic layers of a crystalline lattice. The name of phenomenon, "Bragg diffraction," was given in recognition of the studies of it performed by Bragg.

Later, largely the same behavior was observed during the diffraction of light at optical wavelengths on the acoustic waves of the appropriate frequencies created inside optically transparent solid media. Acoustic waves create a periodic modulation of the index of refraction of a dielectric material via perturbation of its density. As a result, an acoustic wave can be used to manipulate light based on its wavelength. Thus, it functions as a wavelength filter.

Acoustic perturbation, however, is of a temporal nature, and relaxes completely after its source is extinguished and with it disappears the filter. Long-lasting Bragg gratings were first utilized, perhaps, with the invention of full-color holography. It employed relatively thick films of dichromatic gelatins (DCG) for holographic recording of color-realistic images of 3-D objects by using lasers of different colors. Subsequent reconstruction of images with conventional white light sources became possible due to the wavelength selectivity property of volume Bragg gratings. However, to the inventors' knowledge, even though the wavelength selectivity of the volume Bragg gratings was the underlying mechanism that enabled white-light reconstruction of thick-layer DCG display holograms, their utility for separating, combining, or otherwise manipulating specific wavelengths of light with the intention of achieving practical device functionality has not been recognized.

Use of volume Bragg gratings (VBG) recorded in doped lithium niobate photorefractive crystals for filtering light at optical wavelengths was adopted in construction of solar and lidar filters used to isolate light at a particular wavelength from the broad band background. A principal issue, however, is that recording of such filters must be performed at the same wavelength at which the filter will subsequently operate. As a result, the use of these filters is limited to a very limited range of wavelengths where sufficiently powerful lasers exist. Furthermore, the list of appropriate recording materials is confined to two or three narrow classes of photorefractive materials, which often have physical properties that are unsuitable for their intended mode of operation. For example, no material is known to the inventors that would allow construction of practical functional fiber-optic devices that would utilize volume Bragg grating filters recorded at wavelengths in the range of about 800–1650 nm.

This drawback can be partially overcome in photorefractive lithium niobate crystals when a VBG filter is recorded through a different surface than that used for its operation. By using this approach, filters can be constructed in lithium niobate that can operate at wavelengths that are useful for practical photonic devices, such as, for example, fiber-optic devices. Nonetheless, this approach is still rather limited due to a number of factors. First, the usable wavelength range is limited to $\lambda_{op} > n^* \lambda_{rec}$ on the one side, and the near infrared absorption edge of the lithium niobate on the other. Also, for practical devices, the bandwidth of the filter $\Delta\lambda$ is limited by the maximum refractive index modulation achievable in that material (or its dynamic range, $\Delta n$): $\Delta\lambda < (\lambda_{op})^* \Delta n/2n$. This factor substantially limits the usefulness of this type of filter. This approach also requires the use of at least two (and typically four) polished surfaces that are orthogonal to each other, which increases the complexity of the filter manufacturing process and its cost. Additionally, the wavelength of the filter is substantially fixed to the value determined by the angle between the recording beams in the holographic setup. As a result, the wavelength must be controlled precisely for any practical device and is, therefore, unique for a particular wavelength or information-carrying "channel" of light, which complicates the issues in manufacturing of these elements.

SUMMARY OF THE INVENTION

An embodiment of the invention includes a fiber optic device comprising an optical input that provides input radiation having wavelength in a fiber optic range. A transmissive volume Bragg grating (VBG) element redirects the input radiation to an optical receiver. A second optical receiver may be provided to receive radiation transmitted through the VBG element, the transmitted radiation having a second wavelength in the fiber optic range. The device may include a second transmissive VBG element that redirects radiation transmitted through the first VBG element, the transmitted radiation having a second wavelength in the fiber optic range. A second optical receiver may be provided to receive the redirected transmitted radiation. A third optical receiver may be provided to receive radiation transmitted through the second VBG element, the second transmitted radiation having a third wavelength in the fiber optic range. The device may include a second optical input that provides second input radiation having another wavelength in the fiber optic range.

Another embodiment of the invention provides a fiber optic device comprising an optical input that provides input radiation having a plurality of wavelengths in a fiber optic range, and a volume Bragg grating (VBG) element made of sensitized silica glass. The VBG element receives the input radiation and redirects radiation having a first wavelength to an optical receiver.

In another embodiment, a fiber optic device comprising an optical input and a plurality of VBG elements is provided. A first VBG element receives input radiation and redirects first redirected radiation having a first wavelength in the fiber optic range. A second VBG element receives first transmitted radiation from the first VBG element and redirects second redirected radiation having a second wavelength in the fiber optic range. A first optical receiver receives the first redirected radiation and a second optical receiver receives the second redirected radiation. The VBG elements may be disposed along an optical axis of the fiber optic device. A face of the first VBG element may be laminated to a face of the second VBG element.

A fiber optic device according to the invention may include an optical input, a VBG element, and a reflector that reflects transmitted radiation received from the VBG back into the VBG such that the VBG redirects second redirected radiation to a first optical receiver.

A method for controlling filter response is also provided. Such a method includes providing a mask that corresponds to a desired filter response of a volume Bragg grating (VBG) element, and transmitting a recording beam through the mask. The recording beam is transmitted through a lens to a glass that is sensitive to a wavelength of the recording beam. The lens is adapted to perform an optical Fourier transform of a transfer function associated with the mask. A second recording beam may be transmitted to the glass in combination with the first recording beam. The second recording beam may have generally the same wavelength as the first recording beam, such that the first and second recording beams are coherent.

A method for manufacturing a VBG element by forming a large-wafer VBG and segmenting the large-wafer VBG into a plurality of individual VBG elements is also provided. Each of the individual VBG elements retains the index vector of the large-wafer VBG. The large-wafer VBG may be segmented by dicing the large-wafer VBG into the plurality of individual VBG elements.

Another method for manufacturing a VBG element includes forming a first VBG element using a pair of recording beams and using a single recording beam to replicate the first VBG to form a second VBG.

A VBG chip, and fiber optic devices using such a chip, are also provided. A VBG chip includes a monolithic glass structure onto which a plurality of VBGs have been recorded. The VBG chip may include a first grating recorded at a first location on the glass, wherein the first grating is adapted to receive incident light having a plurality of wavelengths in a fiber optic range and to redirect first redirected light having a first wavelength in the fiber optic range. A second grating may be recorded at a second location on the glass to receive the first redirected light. The second grating may be adapted to redirect the first redirected light out of the glass structure. Another grating at another location on the glass may be adapted to receive transmitted light from the first VBG, and to redirect light having a second wavelength in the fiber optic range.

BRIEF DESCRIPTION OF THE DRAWINGS

Certain preferred embodiments of the invention will now be described in detail with reference to the figures. Those skilled in the art will appreciate that the description given herein with respect to the figures is for exemplary purposes only and is not intended in any way to limit the scope of the invention.

DETAILED DESCRIPTION OF ILLUSTRATIVE EMBODIMENTS

Figures 1A, 1B:
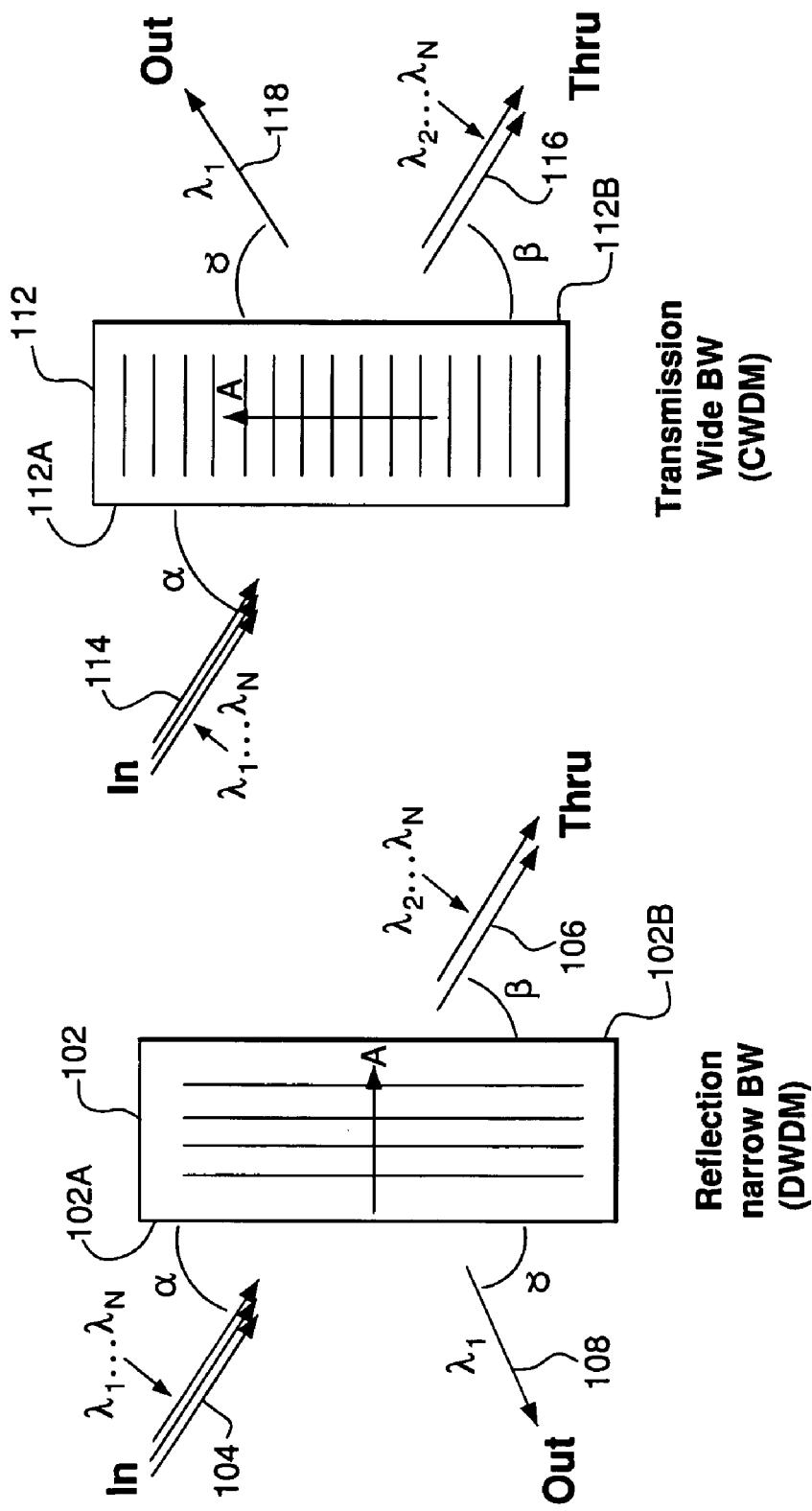
FIGS. 1A and 1B depict reflective and transmissive VBGs, respectively.

Using Sensitized Silica Glasses for Manufacturing of VBG Filters

One of the major problems in developing and using any kind of permanent VBG filters for practical applications has been the unavailability of a material or a class of materials possessing physical properties that are adequate for the practical applications. For example, the photorefractive electro-optic crystals, in which much of the research was conducted on the subject of VBGs, among other problems, are incapable of providing truly permanent, stable recording across a wide temperature range. Furthermore, these crystals are strongly anisotropic, which limits their usage substantially. For these reasons, an entire range of applications of VBG filters in general has not been substantially explored. In fact, to the inventors' knowledge, there is not a single photonic device now in the market that uses VBG elements.

According to the invention, a previously unexplored class of materials, the silicate photorefractive glasses (PRG), can be used to enable the design and manufacturing of practical devices based on VBGs, with special emphasis on photonic devices for fiber-optic applications. This type of materials substantially overcomes all of the above-mentioned drawbacks of the previously studied materials and possesses all the required properties to manufacture devices for demanding applications exemplified by the fiber optics. These properties include, but are not limited to, the following: a) optical transparency in the entire optical window from UV to mid-infrared; b) outstanding longevity of the recorded gratings; c) outstanding thermal stability (>200 C); d) adequate dynamic range; e) excellent optical quality, including the achievable polishing quality of the elements made of this material; f) low manufacturing costs; g) ability to be formed and processed in the adequate shapes and sizes (e.g., flat disks or wafers); h) refractive index isotropy.

Compositions and processes for manufacturing such PRGs are described in U.S. Pat. No. 4,057,408 ("the 408 patent"), the disclosure of which is hereby incorporated herein by reference in its entirety. The 408 patent discloses photosensitive glasses, i.e., glasses which, after an exposure to high energy or actinic radiations, can be heat treated in a certain manner to develop a colored transparent article, or which can be thermally opacified to produce a colored opal glass. More particularly, the 408 patent is directed to alkali halide silver halide-containing photosensitive glasses which, through a sequence of shortwave radiation exposures and heat treatments, exhibit the total range of colors seen in the visible spectrum either in the transparent or in the opacified state and in three dimensions. As described in the 408 patent, the base glass composition can be varied widely, but the presence of silver, alkali oxide, fluorine, at least one of the group consisting of chlorine, bromine, and iodine, and, where ultra-violet radiations comprise the actinic radiations, cerium oxide may be required.

Figure 4:
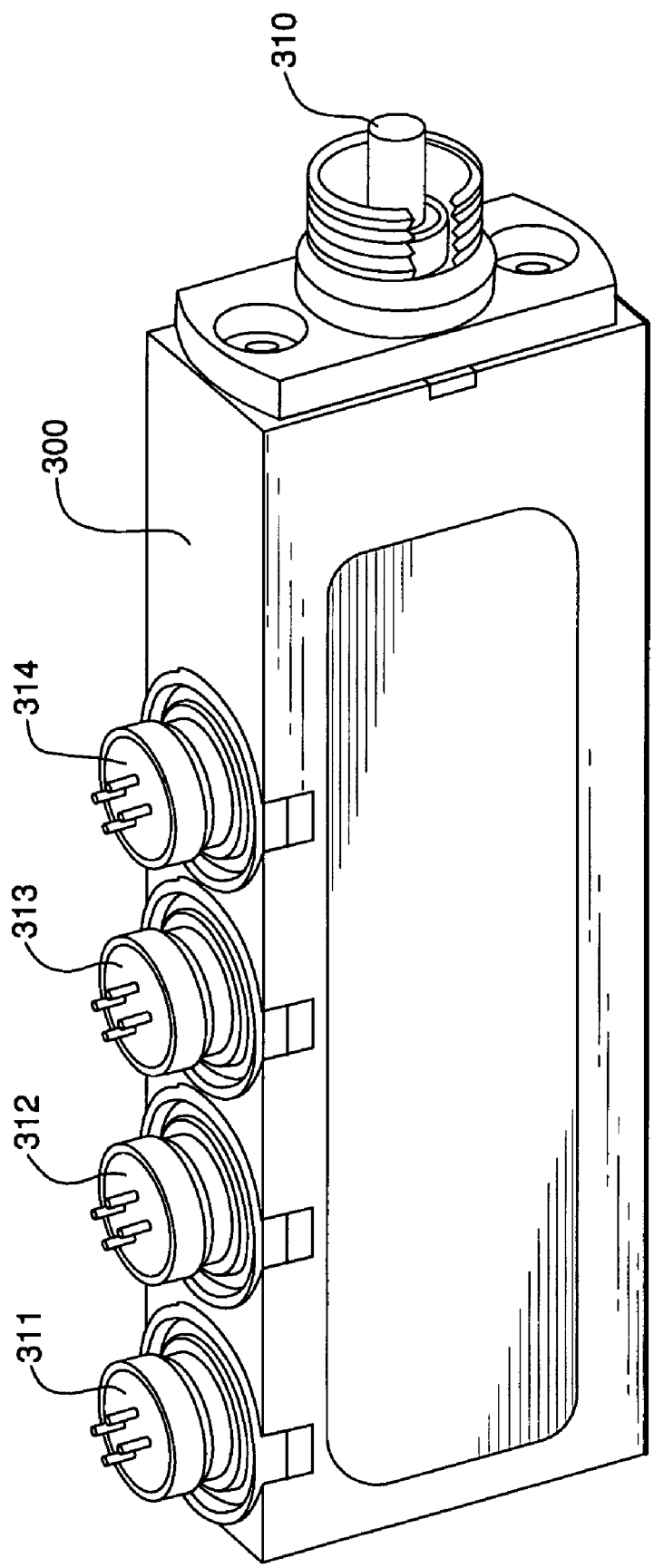
FIG. 4 is a perspective view of a preferred embodiment of a device according to the invention.

Manufacturing of VBG Elements in Silica Glasses by Recording Holographically at a Specific Wavelength and Using Them in Fiber-Optic Devices at an Arbitrary Wavelength As described in the literature on the theory of Bragg diffraction in thick holograms (see, e.g., Kogelnik, H., "Coupled wave theory for thick hologram gratings," The Bell System Technical Journal, November 1969, 48(9), 2909–2947), there are two basic types of the VBGs— transmission and reflection, which are different in their mode of operation (see Kogelnik FIG. 4).

FIG. 1A depicts a reflective VBG 102 having a grating wave vector, A, in the horizontal direction as shown. An input light beam 104 composed of light of a plurality of wavelengths $\lambda_1, \ldots \lambda_N$ is directed toward the VBG 102 at a first angle $\alpha$ to the input face 102A of the VBG 102. The VBG 102 is formed such that it is transparent to all but one of the wavelengths $\lambda_1, \ldots \lambda_N$. That is, the light beam propagates through the grating relatively unaffected, except that the light having a certain wavelength, $\lambda_1$, is filtered out of the beam. As a result, only that light 106 having wavelengths $\lambda_2, \ldots \lambda_N$ continues through the VBG 102 and exits the VBG 102 at a second angle $\beta$ to the output face 102B of the VBG 102. Preferably, the VBG 102 is fabricated so that the angle $\beta$ at which the beam exits the VBG 102 is as near as possible to the angle $\alpha$ at which it entered the VBG 102 (i.e., the beam continues along in a generally straight line). Light 108 having wavelength $\lambda_1$, however, is reflected back at an angle $\gamma$ from the input face 102A of the VBG 102 because of the holography within the VBG 102. That is, the VBG 102 is fabricated such that the index of refraction varies within the VBG 102 to allow light having wavelengths $\lambda_2, \ldots \lambda_N$ to continue through the VBG 102, and light having wavelength $\lambda_1$ to be reflected back at a known angle. Methods for fabricating such VBGs are discussed in detail below.

FIG. 1B depicts a transmissive VBG 112 having a grating wave vector, A, in the vertical direction as shown. An input light beam 114 composed of light of a plurality of wavelengths $\lambda_1, \ldots \lambda_N$ is directed toward the VBG 112 at a first angle $\alpha$ to the input face 112A of the VBG 112. The VBG 112 is formed such that it is transparent to all but one of the wavelengths. That is, the light beam propagates through the grating relatively unaffected, except that the light having a certain wavelength, $\lambda_1$, is filtered out of the beam. As a result, only that light 116 having wavelengths $\lambda_2, \ldots \lambda_N$ continues through the VBG 112 and exits the VBG 112 at a second angle $\beta$ to the output face 112B of the VBG 112. Preferably, the VBG 112 is fabricated so that the angle $\beta$ at which the beam 116 exits the VBG 112 is as near as possible to the angle $\alpha$ at which it entered the VBG 112 (i.e., it continues along in a generally straight line). Light 118 having wavelength $\lambda_1$, however, exits the VBG 112 at a third angle $\gamma$ to the output face 112B because of the holography within the VBG 112. That is, the VBG 112 is fabricated such that the index of refraction varies within the VBG 112 to allow light having wavelengths $\lambda_2, \ldots \lambda_N$ to continue relatively straight through the VBG 112, and light having wavelength $\lambda_1$ to be deflected as it passes through the VBG 112 such that it exits the VBG 112 at a known angle $\beta$ to the output face.

Wavelength filtering properties of transmission and reflection VBGs are different primarily in the width of the filter that can be constructed in an element of practical size. Generally, reflection thick volume holograms have very narrow wavelength bandwidth, with the upper limit determined by the dynamic range of the material, as described above in connection with the example of lithium niobate VBG filters. Conversely, transmission thick volume holograms generally have wider bandwidth, which, historically, has precluded their use for the generation of white light color display holograms.

Nonetheless, when recorded in a sufficiently thick slab of a transparent material (e.g., >1 mm), a method can be devised to record transmission VBGs that can achieve bandwidths sufficiently narrow for practical photonic devices (e.g., bandwidth of 30 nm or less).

Another principal difference between reflection VBGs and transmission VBGs is that the transmission type allows tuning of the central wavelength of the filter by adjusting the incident angle of light upon the VBG. For that reason, a VBG filter can be recorded at one wavelength (e.g., in the UV range where silicate PRGs are sensitive) and operate at another (e.g., in the 850 nm to 1650 nm range typically employed in various fiber-optic devices). This can be achieved without the limitations of recording through an orthogonal side of the element, described above for the case of the lithium niobate VBG filters. This means that: a) the range of the usable wavelengths is practically unlimited; b) wider bandwidths are readily available; c) there is no need for polishing additional surfaces.

The use of permanent transmission VBGs as band-pass filters for manipulation of wavelengths in photonic devices, exemplified by the fiber-optic active and passive components, has not been explored so far probably for one or more of the following reasons: a) strong anisotropy of the material (e.g., inorganic electro-optic photorefractive crystals); b) impossible to manufacture in sufficiently thick layers (>1 mm, e.g., DCG); c) impossible to achieve sufficient optical quality of the bulk material and/or polishing quality of the surfaces (e.g., photo-polymers); d) insufficient temperature stability.

Figure 2:
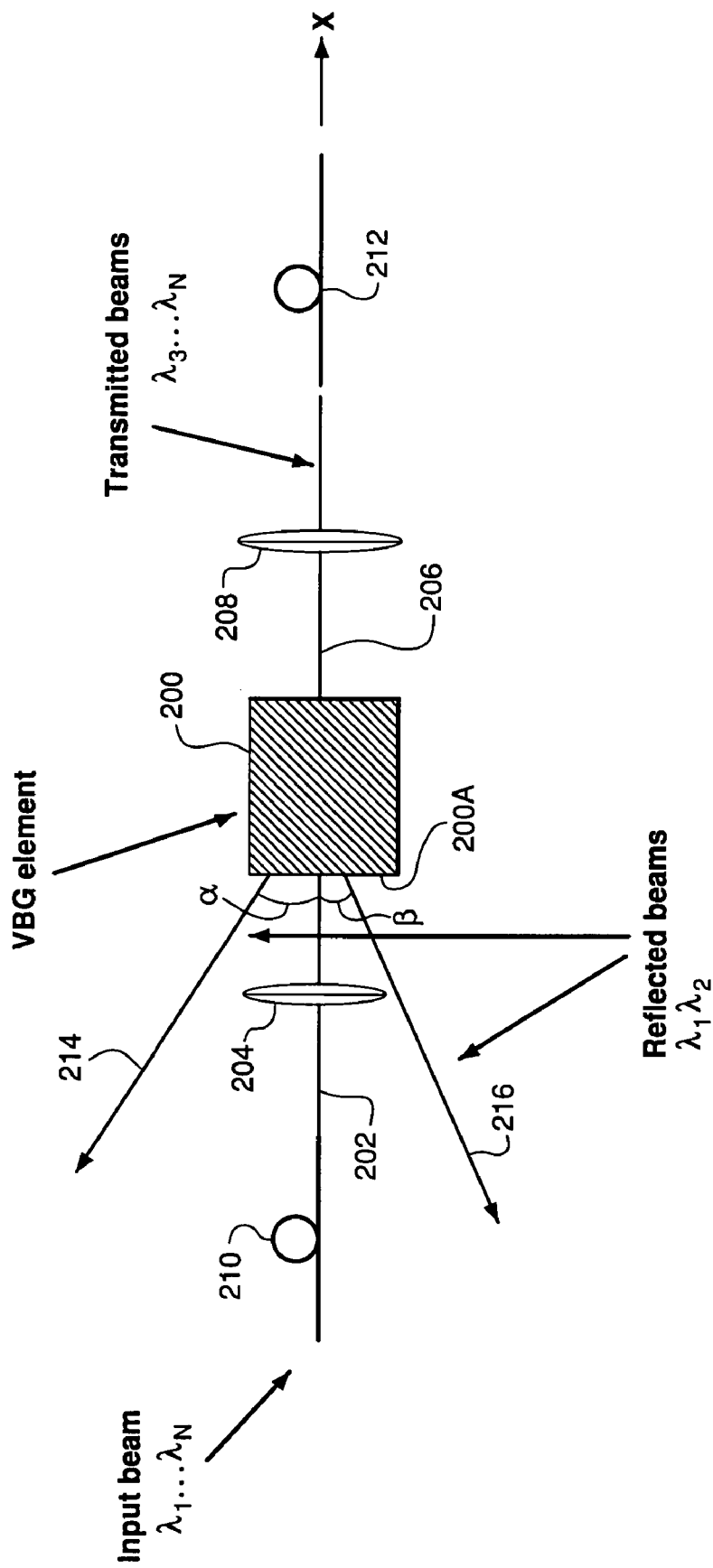
FIG. 2 demonstrates the transparency property of a VBG.

FIG. 2 demonstrates the transparency property of a VBG 200 in which an input light beam 202 composed of light of a plurality of wavelengths $\lambda_1, \ldots \lambda_N$ is directed toward the VBG 200, through a lens 204, along an optical axis, x, of the device. As shown, the input light beam 202 can be emitted from an optical fiber 210. The VBG element 200 is fabricated such that the index of refraction varies within the VBG 200 to allow light 206 having wavelengths $\lambda_3, \ldots \lambda_N$ to continue relatively straight through the VBG 200, through a lens 208, and into a receiver 212, which can be another output optical fiber, for example, as shown. Light 214 having wavelength $\lambda_1$, however, is reflected back at a first angle $\alpha$ from the input face 200A of the VBG 200. Similarly, light

216 having wavelength $\lambda_2$ is reflected back at a second angle $\beta$ from the input face 200A of the VBG 200 because of the holography within the VBG 200.

Figure 3:
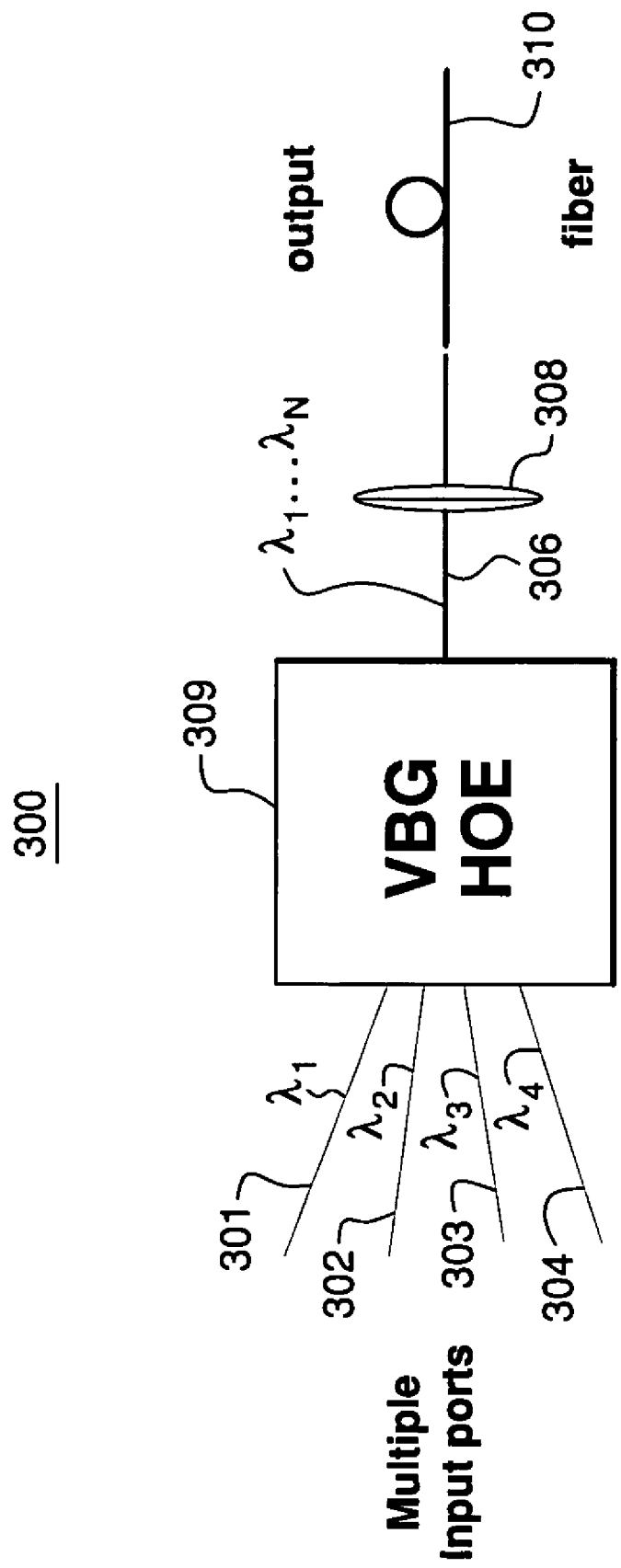
FIG. 3 is a schematic of a device according to the invention for combining a plurality of optical inputs into a single optical fiber output.
Figure 5:
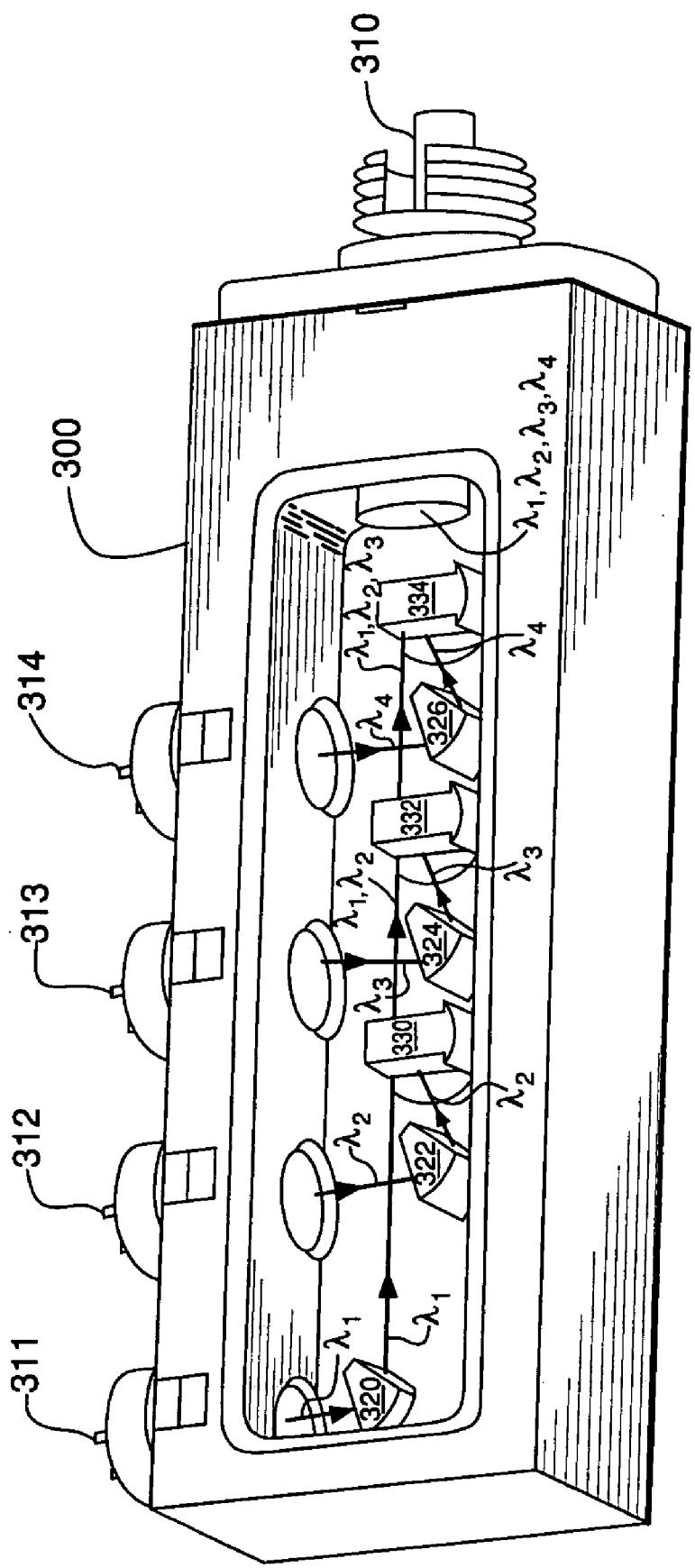
FIG. 5 depicts the interior of a device such as shown in FIG. 4.

FIGS. 3–5 depict a preferred embodiment of a fiber optic device 300 according to the invention for combining a plurality of optical inputs 311–314 into a single optical output 310. As shown, the device 300 includes four optical inputs 311–314, which can be laser diodes, as shown, or optical fibers, for example. Each optical input 311–314 carries light 301–304 of a different wavelength $\lambda_1$–$\lambda_4$. The device 300 also includes three VBG elements 330, 332, 334. Light 301 from the first input 311, having wavelength $\lambda_1$, is transmitted into the interior of the device 300, where it is deflected via a first deflector 320 (such as a mirror, for example) such that it enters the first VBG element 330 at a known angle. As shown, the light travels along the optical axis of the device, and enters the VBG 330 a known angle to the input face of the VBG 330. The first VBG 330 is transparent to light having wavelength $\lambda_1$, so the light having wavelength $\lambda_1$ exits the first VBG 330 without being deflected by the VBG.

Light 302 from the second input 312, having wavelength $\lambda_2$, is transmitted into the interior of the device 300, where it is deflected via a second deflector 322 such that it enters the first VBG element 330 at a known angle. The first VBG 330 deflects the light having wavelength $\lambda_2$ such that the light having wavelength $\lambda_2$ exits the first VBG 330 without being deflected by the VBG and, therefore, is combined with the light having wavelength $\lambda_1$.

Similarly, light 303 from the third input 313, having wavelength $\lambda_3$, is transmitted into the interior of the device 300, where it is deflected via a third deflector 324 such that it enters the second VBG element 332 at a known angle. The second VBG 332 deflects the light having wavelength $\lambda_3$ such that the light having wavelength $\lambda_3$ exits the second VBG 332 without being deflected by the second VBG 332. The second VBG 332 is transparent to light having wavelength $\lambda_1$ or $\lambda_2$. Consequently, the light having wavelength $\lambda_3$ is combined with the light having wavelength $\lambda_1$ and $\lambda_2$.

Similarly, light 304 from the fourth input 314, having wavelength $\lambda_4$, is transmitted into the interior of the device 300, where it is deflected via a fourth deflector 326 such that it enters the third VBG element 334 at a known angle. The third VBG 334 deflects the light having wavelength $\lambda_4$ such that the light having wavelength $\lambda_4$ exits the third VBG 334 without being deflected by the third VBG 334. The third VBG 334 is transparent to light having wavelength $\lambda_1$, $\lambda_2$, or $\lambda_3$. Consequently, the light having wavelength $\lambda_4$ is combined with the light having wavelength $\lambda_1$, $\lambda_2$, and $\lambda_3$.

Thus, an output light beam 306 composed of light have wavelengths $\lambda_1$, $\lambda_2$, $\lambda_3$, and $\lambda_4$ can be formed using a plurality of VBG elements. The output light beam 306 is received by an optical receiver 310, such as an optical fiber. It should be understood that, by reversing the direction of the light flow, a device as shown in FIG. 5 can be used to generate a plurality of output light beams, each having a known wavelength, from an input light beam composed of light having a plurality wavelengths.

Figure 6:
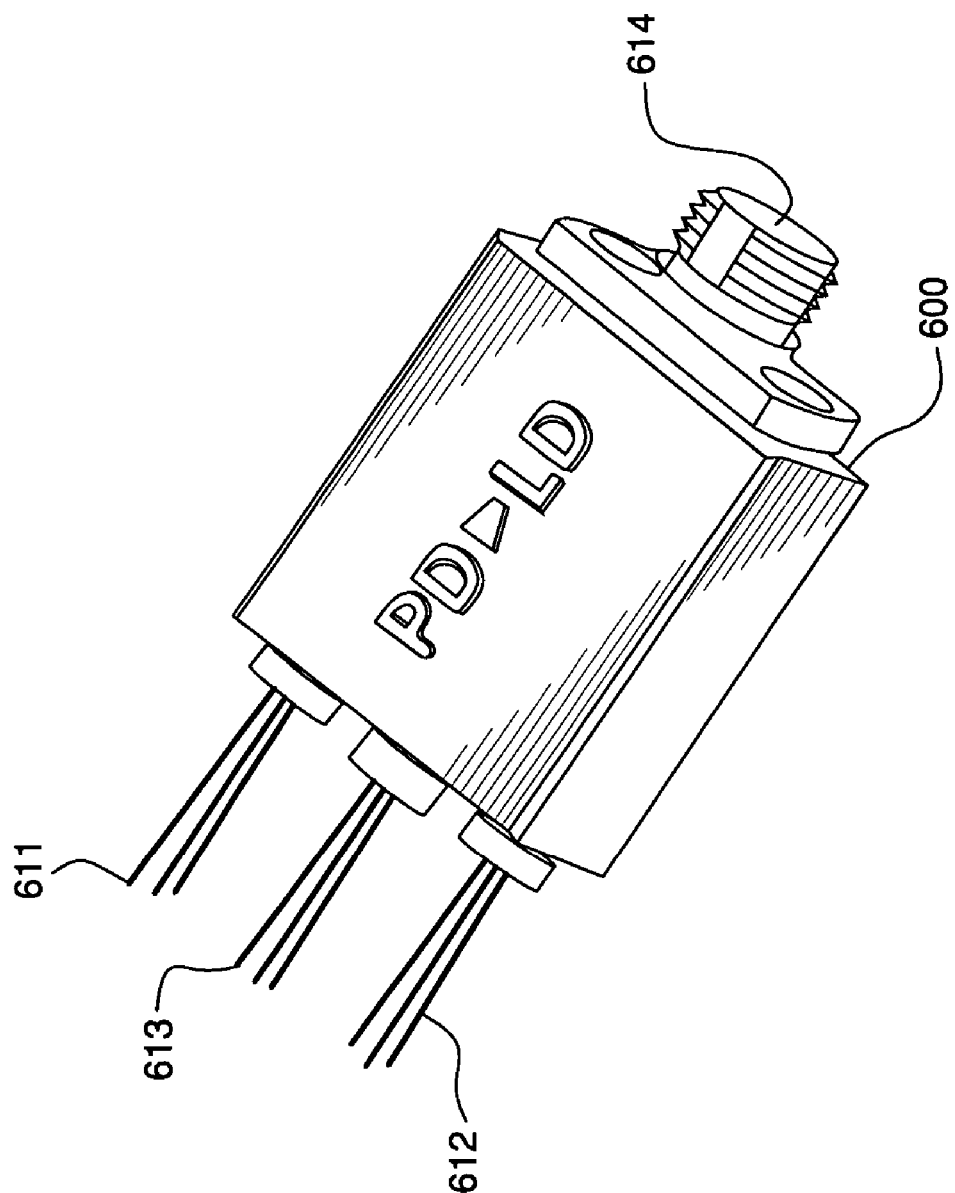
FIG. 6 is a perspective view of another preferred embodiment of a device according to the invention.
Figure 7:
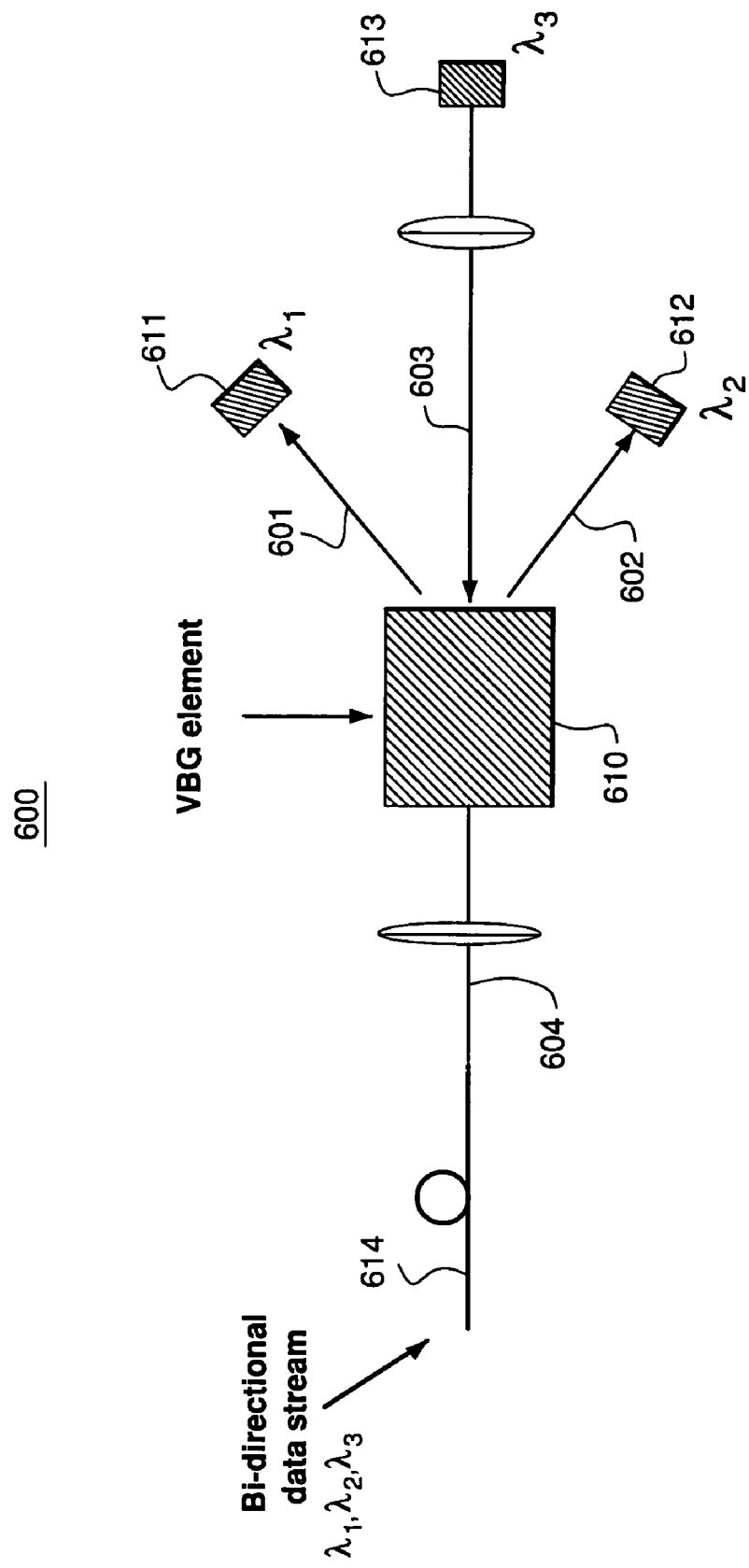
FIG. 7 is a schematic diagram of a device such as shown in FIG. 6.

FIGS. 6 and 7 depict a preferred embodiment of a triplexer bi-directional transmitter/receiver 600 according to the invention. As shown, the device 600 includes an optical input 613, two optical outputs, such as receivers 611, 612, and a bi-directional optical carrier 614, each of which can be an optical fiber, for example. The bi-directional carrier 614 carries light 604 having wavelengths $\lambda_1 \ldots \lambda_3$ as shown. The first output 611, which may be a photodiode, for example, as shown, receives light 601 of wavelength $\lambda_1$. The second output 612, which may also be a photodiode, for example, as shown, carries light 602 of wavelength $\lambda_2$. The optical input 613, which may be a laser diode, for example, as shown, transmits light 603 of wavelength $\lambda_3$.

The VBG 610 is fabricated such that it is transparent to light having wavelength $\lambda_3$, which is transmitted to the VBG 610 via the optical input 613. The VBG 610 can also be fabricated such that it deflects light 601 having wavelength $\lambda_1$ and light 602 having wavelength $\lambda_2$. The light 601 having wavelength $\lambda_1$ can be received by the first optical output 611, and the light having wavelength $\lambda_2$ can be received by the second optical output 612. The bi-directional carrier 614 carries light 604 having wavelength $\lambda_1$ and wavelength $\lambda_2$ in a first direction (toward the VBG) and wavelength $\lambda_3$ in a second direction (away from the VBG).

Figure 8:
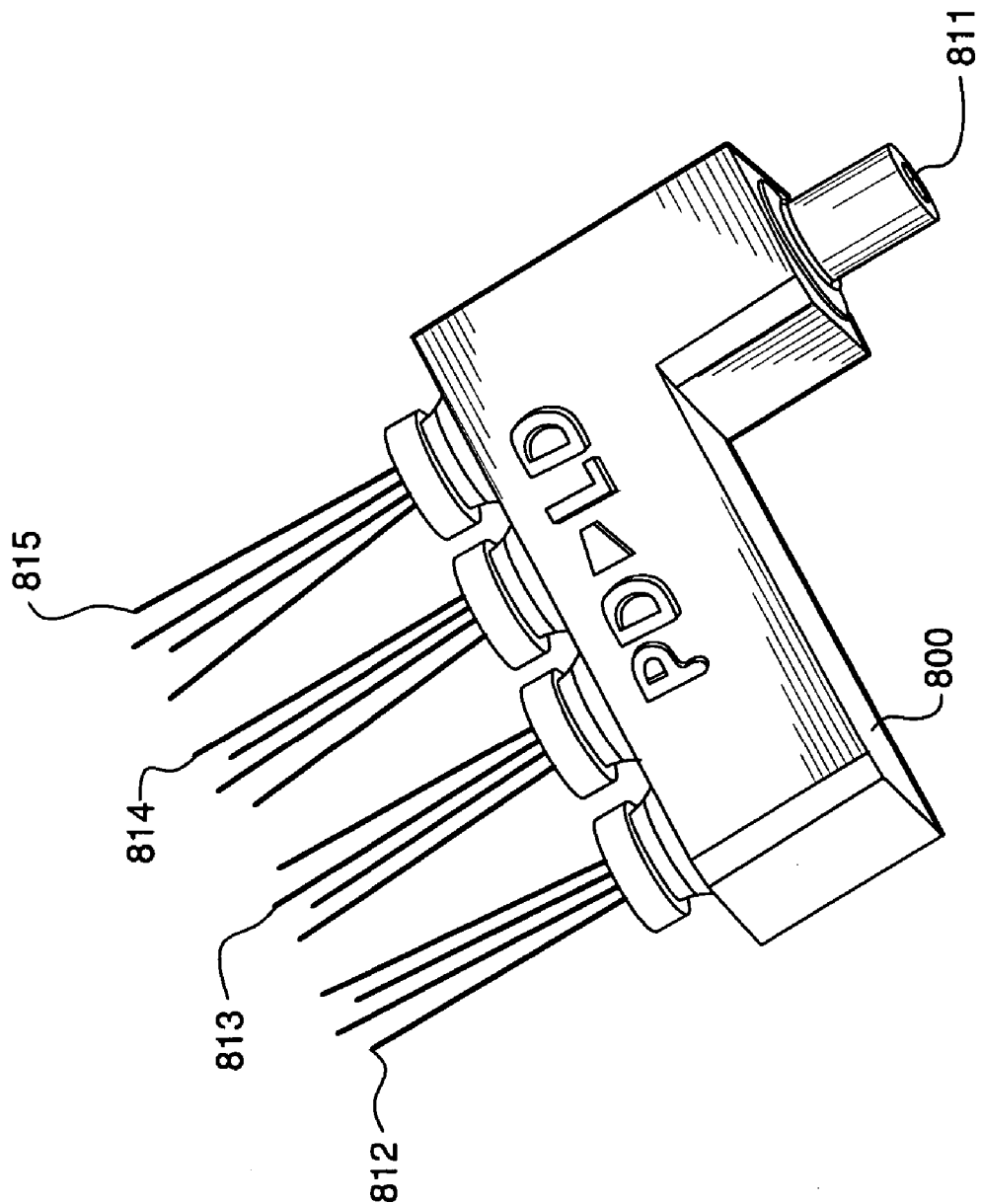
FIG. 8 is a perspective view of another preferred embodiment of a device according to the invention.

FIG. 8 depicts a preferred embodiment of a Xenpak form-factor CWDM transmitter 800 according to the invention. As shown, the device 800 includes an optical input 811 and four optical outputs 812–815, each of which can be a laser diode, as shown, or an optical fiber, for example. The optical input carries light having wavelengths $\lambda_1 \ldots \lambda_4$. The first output 811 carries light of wavelength $\lambda_1$; the second output 812 carries light of wavelength $\lambda_2$; the third output 813 carries light of wavelength $\lambda_3$; and the fourth output 814 carries light of wavelength $\lambda_4$.

Figure 9:
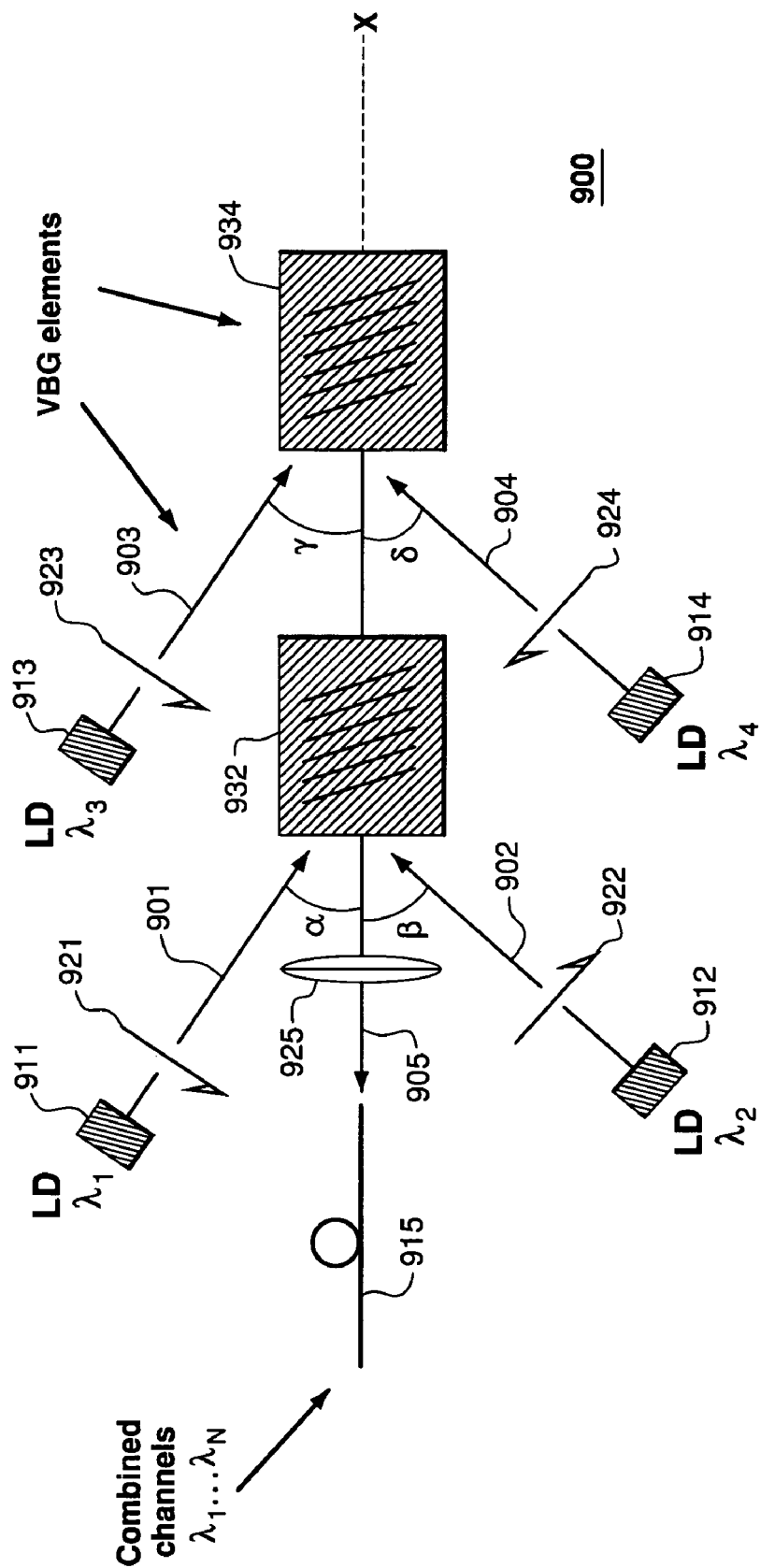
FIG. 9 is a schematic diagram of a DWDM multi-source combiner according to the invention.

FIG. 9 is a schematic diagram of a DWDM multi-source combiner 900 according to the invention. As shown, the multi-source combiner 900 includes four optical inputs 911–914, such as optical fibers, for example. Each optical input 911–914 carries light of a different wavelength $\lambda_1, \ldots \lambda_4$ as shown. The device 900 also includes two VBG elements 932, 934. Light 901 from the first input 911, having wavelength $\lambda_1$, is transmitted, preferably through a lens 921, such that it enters the first VBG element 932 at a first known angle $\alpha$. The first VBG 932 is fabricated such that the light 901 having wavelength $\lambda_1$ is deflected from the first VBG 932 along the optical axis x of the device 900. Similarly, light 902 from the second input 912, having wavelength $\lambda_2$, is transmitted, preferably through a lens 922, such that it enters the first VBG element 932 at a second known angle $\beta$. The first VBG 932 is fabricated such that the light 902 having wavelength $\lambda_2$ is also deflected from the first VBG 932 along the optical axis x of the device 900.

Light 903 from the third input 913, having wavelength $\lambda_3$, is transmitted, preferably through a lens 923, such that it enters the second VBG element 934 at a third known angle $\gamma$. The second VBG 934 is fabricated such that the light 903 having wavelength $\lambda_3$ is deflected from the VBG 934 along the optical axis x of the device 900. Similarly, light 904 from the fourth input 914, having wavelength $\lambda_4$, is transmitted, preferably through a lens 924, such that it enters the second VBG element 934 at a fourth known angle $\delta$. The second VBG 934 is fabricated such that the light 904 having wavelength $\lambda_4$ is also deflected from the second VBG 934 along the optical axis x of the device 900. The first VBG 932 is transparent to light having wavelength $\lambda_3$ and $\lambda_4$. Thus, light beams having respective wavelengths $\lambda_1, \lambda_2, \lambda_3$, and $\lambda_4$ can be combined into a single optical beam 905, which can then be transmitted, preferably through a lens 925, to an optical receiver 915, such as an optical fiber, for example.

Figure 10:
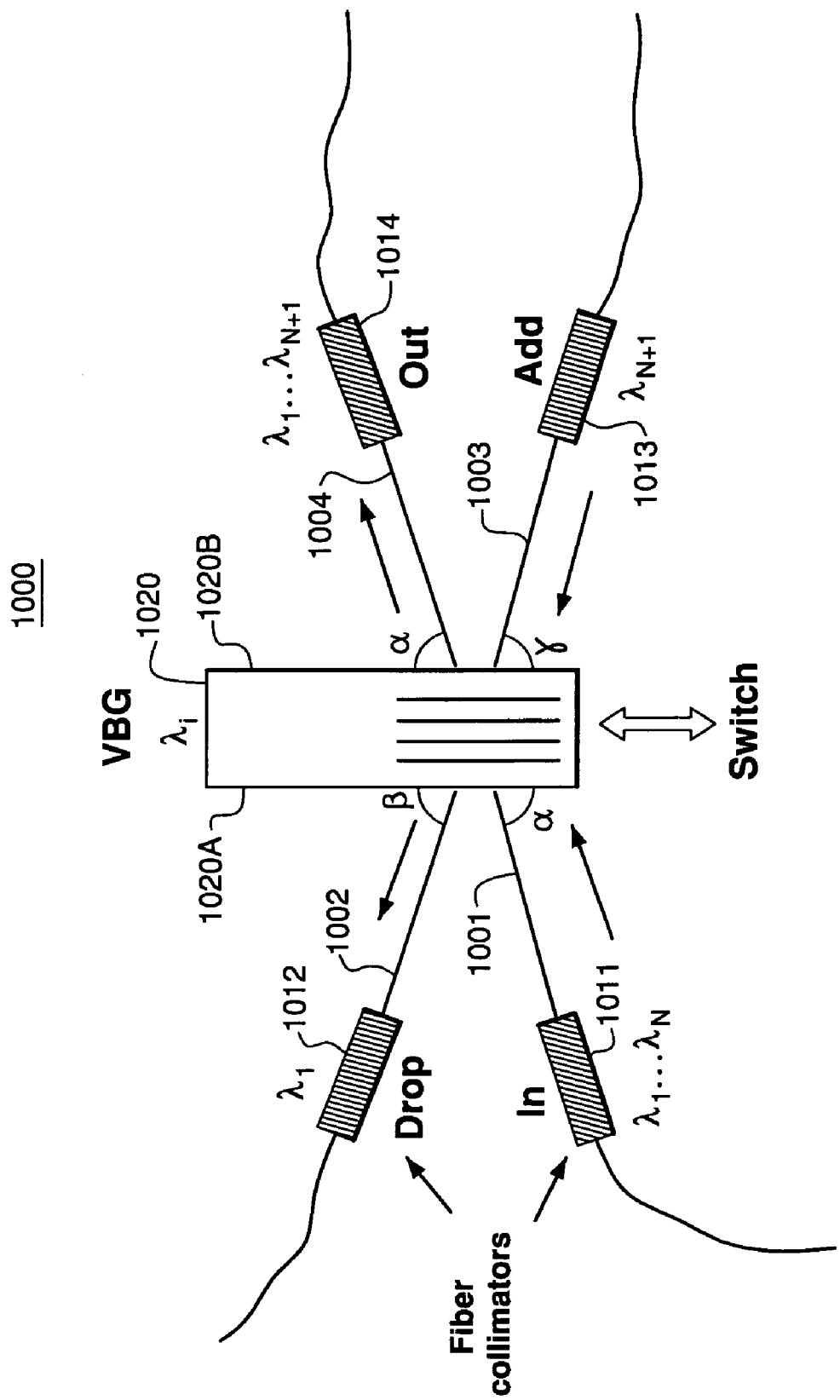
FIG. 10 is a schematic diagram of an optical add-drop multiplexer according to the invention.

FIG. 10 is a schematic diagram of a free-space optical add-drop multiplexer (OADM) 1000 according to the invention. As shown, the OADM 1000 includes an optical input 1011, such as an optical fiber, for example, that carries light 1001 having wavelengths $\lambda_1, \ldots \lambda_N$ as shown. As shown in FIG. 10, the OADM 1000 includes a VBG element 1020 that is fabricated to reflect light 1002 having wavelength $\lambda_1$. The VBG 1020 is transparent to light having wavelengths $\lambda_2, \ldots \lambda_N$. The light beam 1001 from the first input 1011 is incident onto the VBG 1020 at a first angle $\alpha$ to a first face 1020A of the VBG element 1020. Consequently, a light beam 1002 having wavelength $\lambda_1$ is deflected at a second angle $\beta$ from the face 1020A of the VBG element 1020. The light beam 1002 having wavelength $\lambda_1$ is thus "dropped" from the input signal, and can be directed to an optical receiver 1012, such as another optical fiber, for example.

The OADM 1000 also includes an additional input 1013, which can be an optical fiber, for example, that carries a light beam 1003 having wavelength $\lambda_{N+1}$. The light beam 1003 having wavelength $\lambda_{N+1}$ is incident onto the VBG 1020 at an angle $\gamma$ to a second face 1020B of the VBG 1020. The VBG element 1020 is fabricated to reflect light having wavelength $\lambda_{N+1}$ from the second face 1020B such that the light 1003 from the additional input 1013 is combined with the light from the first input to form an output light beam 1004 having wavelengths $\lambda_2, \ldots \lambda_{N+1}$. The output light beam 1004 can be directed to an optical receiver 1014, such as another optical fiber, for example.

Figure 11:
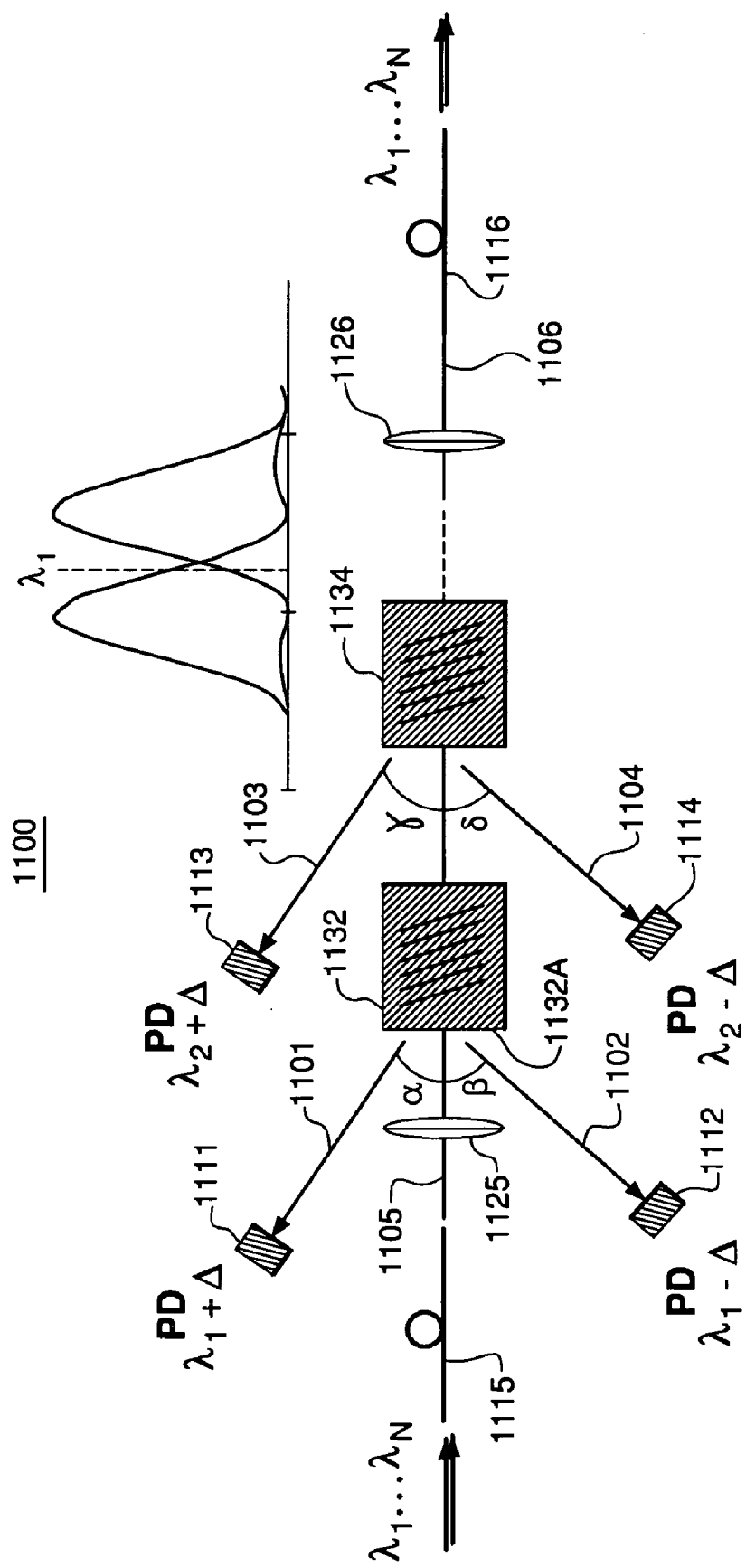
FIG. 11 is a schematic diagram of a multi-channel wavelength monitor according to the invention.

FIG. 11 is a schematic diagram of a multi-channel wavelength monitor 1100 according to the invention. As shown, the multi-channel wavelength monitor 1100 includes an optical input 1115 that carries light 1005 having wavelengths $\lambda_1, \ldots \lambda_N$. The monitor 1100 also includes two VBG elements 1132, 1134. The input light beam 1105 is transmitted, preferably through a lens 1125, such that it enters the first VBG element 1132 at a first known angle (preferably, along the optical axis x of the device 1100, that is, 90° to the face 1132A of the first VBG 1132). The first VBG 1132 is fabricated such that the light 1101 having wavelength $\lambda_1+\Delta$ is deflected from the first VBG 1132 at a first angle $\alpha$, and light 1102 having wavelength $\lambda_1-\Delta$ is deflected from the first VBG 1132 at a second angle $\beta$. The first VBG 1132 is transparent to the rest of the wavelengths in the input beam 1105. Light 1101 having wavelength $\lambda_1+\Delta$ may be received by an optical receiver 1111, and light 1102 may be received by an optical receiver 1112.

The light beam is then transmitted to the second VBG element 1134, which is fabricated such that the light 1103 having wavelength $\lambda_2+\Delta$ is deflected from the second VBG 1134 at a first angle $\gamma$, and light 1104 having wavelength $\lambda_2-\Delta$ is deflected from the second VBG 1134 at a second angle $\delta$. Light 1103 having wavelength $\lambda_2+\Delta$ may be received by an optical receiver 1113, and light 1104 having wavelength $\lambda_2-\Delta$ may be received by an optical receiver 1114. The second VBG 1134 is transparent to the rest of the wavelengths in the beam. The output beam 1106 can then be received, preferably through a lens 1126, by an optical receiver 1116, which can be another optical fiber, for example.

Methods for Packaging Devices with Large Channel Counts Using VBG Filters

One of the main advantages of VBG filters and, indeed, their unique property is the ability to record multiple filters sharing the same volume of the material. This allows for the fabrication of devices of very small size and unique functionality. Nevertheless, the number of gratings that can share the same volume, known as the multiplexing number, or the M/#, in the holographic memory field, is limited by the dynamic range of the material. For that reason, for practical materials suitable for manufacturing of VBG filters, that number will typically be rather limited (a realistic estimate is around 4 filters for a 4 mm thick element). Furthermore, fabrication of VBG filters with a larger number of gratings becomes progressively more complex, while at the same time reducing the flexibility in packaging them in a device. In addition, when sharing the same volume, the combined effect of the VBGs can be obtained via the coherent addition of the effects of the individual gratings, which results in the appearance of cross-terms, leading sometimes to undesirable side effects. It is, therefore, desirable to have a practical method for manufacturing devices with sufficiently large channel count. According to one aspect of the invention, fiber optic devices can be fabricated which can have a basically unlimited number of channels while using very simple VBG elements as building blocks.

Figure 12:
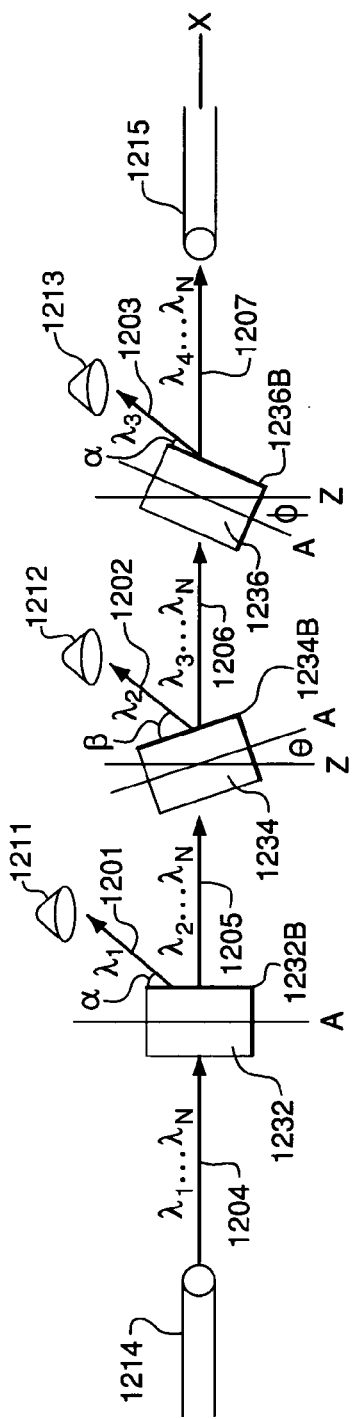
FIG. 12 depicts chain cascading of a plurality of VBGs in a fiber optic device according to the invention.

FIG. 12 depicts a device according to the invention in which any number of transmissive VBG filters can be combined to construct a device with an arbitrary channel count and for an arbitrary set of wavelengths. Preferably, the VBG filters are identical, thereby reducing the cost of fabrication. In this approach, the individual VBG elements are positioned on the main optical axis of the device and their tilt angles are adjusted individually in order to tune it to the peak wavelength of the desired channel. This approach may be referred to as "chain cascading."

As shown in FIG. 12, an optical input 1214 carries light 1204 having wavelengths $\lambda_1, \ldots \lambda_N$. Light 1204 is incident on a first VBG element 1232 along the optical axis x of the device. The first VBG 1232 is fabricated such that the light 1201 having wavelength $\lambda_1$ is deflected from the first VBG 1232 at a first angle $\alpha$ to the exit face 1232B of the VBG 1232. As shown, the VBG 1232 is positioned such that its grating vector A and exit face 1232B are perpendicular to the optical axis x of the device. Thus, the light 1201 having wavelength $\lambda_1$ is deflected from the first VBG 1232 at an angle 90-$\alpha$ to the optical axis x of the device. The device may include a first optical receiver 1211 that receives the deflected beam 1201. The first VBG 1232 is transparent to the rest of the wavelengths $\lambda_2, \ldots \lambda_N$ in the input beam 1204, such that a transmitted beam 1205 having wavelengths $\lambda_2, \ldots \lambda_N$ is transmitted through the VBG 1232 along the optical axis x.

The transmitted beam 1205 is incident on a second VBG element 1234. The second VBG 1234 may be fabricated, like the first VBG 1234, such that light having wavelength $\lambda_1$ would be deflected from the second VBG 1234 at a first angle $\alpha$ to the exit face 1234B of the VBG 1234. As shown, the VBG 1234 is positioned such that its grating vector A and exit face 1234B are at a known angle $\theta$ (>90°) to the optical axis x of the device. Light 1202 having wavelength $\lambda_2$ is deflected from the second VBG 1234 at a known angle $\beta$ to the exit face 1234B of the VBG 1234 (and, therefore, at a known angle to the optical axis x). The device may include a second optical receiver 1212 that receives the deflected beam 1202. The second VBG 1234 is transparent to the rest of the wavelengths $\lambda_3, \ldots \lambda_N$ in the transmitted beam 1205, such that a second transmitted beam 1206 having wavelengths $\lambda_3, \ldots \lambda_N$ is transmitted through the VBG 1234 along the optical axis x.

The transmitted beam 1206 is incident on a third VBG element 1236. The third VBG 1236 may be fabricated, like the first VBG 1232, such that light having wavelength $\lambda_1$ would be deflected from the third VBG 1236 at a first angle $\alpha$ to the exit face 1236B of the VBG 1236. As shown, the VBG 1236 is positioned such that its grating vector A and exit face 1236B are at a known angle $\phi$ (<90°) to the optical axis x of the device. Light 1203 having wavelength $\lambda_3$ is deflected from the third VBG 1236 at a known angle $\gamma$ to the exit face 1236B of the VBG 1236 (and, therefore, at a known angle to the optical axis x). The device may include a third optical receiver 1213 that receives the deflected beam 1203.

The third VBG 1236 is transparent to the rest of the wavelengths $\lambda_4, \ldots \lambda_N$ in the transmitted beam 1206, such that a third transmitted beam 1207 having wavelengths $\lambda_4, \ldots \lambda_N$ is transmitted through the VBG 1236 along the optical axis x. The device may include a fourth optical receiver 1215 that receives the transmitted beam 1207.

Figure 13:
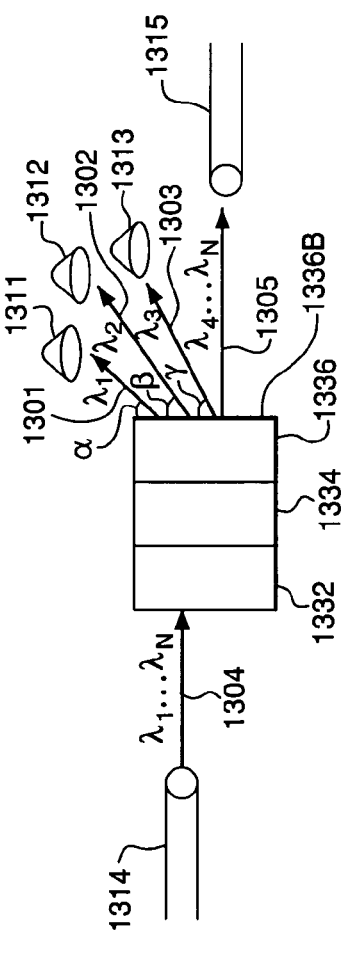
FIG. 13 depicts lamination cascading of a plurality of VBGs in a fiber optic device according to the invention.

FIG. 13 depicts a device according to the invention that includes a complex VBG filter element that has been fabricated from a number of simple, possibly identical, VBG elements. In function it is similar to the device described above in connection with FIG. 12 but instead of being positioned and adjusted individually in the package, the elements can be properly positioned in a suitable fixture in direct physical contact with one another and then permanently bonded together, using suitable bonding materials that are well known in the art, thus creating a single compounded element with complex functionality.

The positioning of the individual VBG elements with respect to one another in such an arrangement can be important to the usefulness of the assembly. Methods of exercising such control can include: a) proper surface preparation of the wafers of the recording material, such as polishing, parallelism of the surfaces etc.; b) proper rotational orientation of the elements with respect to each other during the bonding procedure; c) use of calibrated spacers to the adjust relative angle between the individual VBG elements; d) precise control of the tilt angle of the wafer with respect to the recording laser beams during the holographic recording process.

This approach, referred to as "lamination cascading," enables the achievement of the same density of the grating packing in the same package volume as the direct multiplexing of the filters during the recording process, but without the need of multiple exposures and without the physical overlap, and thus interference, of the individual filters in the bulk of the material.

As shown in FIG. 13, an optical input 1314 carries light 1304 having wavelengths $\lambda_1, \ldots \lambda_N$. Light 1304 is incident on a series of VBG elements 1332–1336 along the optical axis x of the device. The VBG elements 1332–1336 are fabricated such that light 1301 having wavelength $\lambda_1$ is deflected from the third VBG 1336 at a first angle $\alpha$ to the exit face 1336B of the VBG 1336, light 1302 having wavelength $\lambda_2$ is deflected from the third VBG 1336 at a second angle $\beta$ to the exit face 1336B of the VBG 1336, and light 1303 having wavelength $\lambda_3$ is deflected from the third VBG 1334 at a third angle $\gamma$ to the exit face 1336B of the VBG 1336. The device may include a first optical receiver 1311 that receives the deflected beam 1301, a second optical receiver 1312 that receives the deflected beam 1302, and a third optical receiver 1313 that receives the deflected beam 1303. The VBGs 1332–1336 may be transparent to the rest of the wavelengths $\lambda_4, \ldots \lambda_N$ in the input beam 1304, such that a transmitted beam 1305 having wavelengths $\lambda_4, \ldots \lambda_N$ is transmitted through the VBGs 1332–1336 along the optical axis x. The device may include a fourth optical receiver 1315 that receives the transmitted beam 1305.

Figure 14:
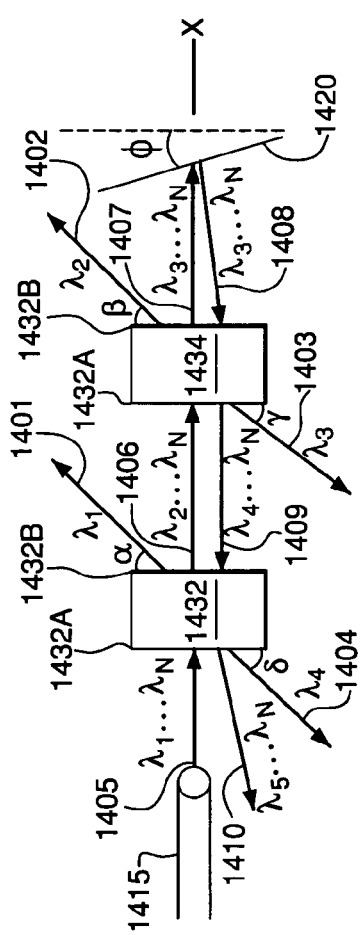
FIG. 14 depicts a multiple path device according to the invention.

FIG. 14 depicts a device according to the invention in which any simple, individual VBG element can be used for processing several wavelength channels by allowing multiple paths through it in different directions. In its simplest form, the so-called "double pass configuration" functions as follows:

A series of simple individual VBG elements is positioned in line as described above in connection with FIG. 12. A mirror is placed at the end of the chain of the elements, which reflects the transmitted light back onto the same elements. This has the effect of folding the chain of the elements back onto itself. The mirror angle is adjusted slightly, so that the angle of the back-reflected light is somewhat different than the forward-propagating light. This angle is adjusted in such a way as to tune the center wavelength of the VBG filters to the desired value.

In such an implementation, the method allows using each of the VBG elements more than once, thus effectively increasing the number of filters without increasing the number of VBG elements, and thereby enabling the overall size of the package to remain practically the same. Multiple path folding is also possible if an additional mirror is used in the beginning of the chain of the VBG elements, slightly offset from the axis in angle and space.

As shown in FIG. 14, an optical input 1415 carries light 1405 having wavelengths $\lambda_1, \ldots \lambda_N$. Light 1405 is incident on a first VBG element 1432 along the optical axis x of the device. The first VBG 1432 is fabricated such that light 1401 having wavelength $\lambda_1$ is deflected from the first VBG 1432 at an angle $\alpha$ to the exit face 1432B of the first VBG 1432. The first VBG 1432 is transparent to the rest of the wavelengths $\lambda_2, \ldots \lambda_N$ in the input beam 1405, such that a transmitted beam 1406 having wavelengths $\lambda_2, \ldots \lambda_N$ is transmitted through the VBG 1432 along the optical axis x.

The transmitted beam 1406 is incident on a second VBG element 1434. The second VBG 1434 is fabricated such that light 1402 having wavelength $\lambda_2$ is deflected from the second VBG 1434 at an angle $\beta$ to the exit face 1434B of the second VBG 1434. The second VBG 1434 is transparent to the rest of the wavelengths $\lambda_3, \ldots \lambda_N$ in the transmitted beam 1406, such that a transmitted beam 1407 having wavelengths $\lambda_3, \ldots \lambda_N$ is transmitted through the VBG 1434 along the optical axis x.

The transmitted beam 1407 is directed toward a mirror 1420, which is disposed at an angle $\phi$ to the optical axis x of the device. The reflected beam 1408 is incident on the second VBG 1434 at an angle $\phi$ to the exit face 1434B. The second VBG 1434 is fabricated such that light 1403 having wavelength $\lambda_3$ is deflected from the second VBG 1434 at an angle $\gamma$ to the entrance face 1434A of the second VBG 1434. The second VBG 1434 is transparent to the rest of the wavelengths $\lambda_4, \ldots \lambda_N$ in the reflected beam 1408, such that a reflected beam 1409 having wavelengths $\lambda_4, \ldots \lambda_N$ is transmitted through the VBG 1434.

The reflected beam 1409 is incident on the first VBG 1432 at an angle $\phi$ to the exit face 1432B. The first VBG 1434 is fabricated such that light 1404 having wavelength $\lambda_4$ is deflected from the first VBG 1432 at an angle $\delta$ to the entrance face 1432A of the first VBG 1432. The first VBG 1432 is transparent to the rest of the wavelengths $\lambda_5, \ldots \lambda_N$ in the reflected beam 1409, such that a reflected beam 1410 having wavelengths $\lambda_5, \ldots \lambda_N$ is transmitted through the VBG 1432.

The device may include a first optical receiver that receives the deflected beam 1401, a second optical receiver that receives the deflected beam 1402, and a third optical receiver that receives the deflected beam 1403, and a fourth optical receiver that receives the deflected beam 1404. The device may also include a fifth optical receiver that receives the reflected beam 1410.

It should be understood that any of the techniques described above can be optimized to take maximum advantage of VBG properties such as: transparency to all but one wavelength, angular tunability, functionality distributed over the volume of a thick material, material rigidity and dimensional stability, excellent polishing qualities, and the like.

Methods for Economically Manufacturing VBG Elements

In the manufacturing of VBG elements, it is typically desirable to minimize the costs of production of such elements. For that reason, holographic recording of each element individually is likely to be cost-prohibitive for most or all of the high-volume applications. A number of methods according to the invention for cost-effective production of such elements will now be described.

Figure 15:
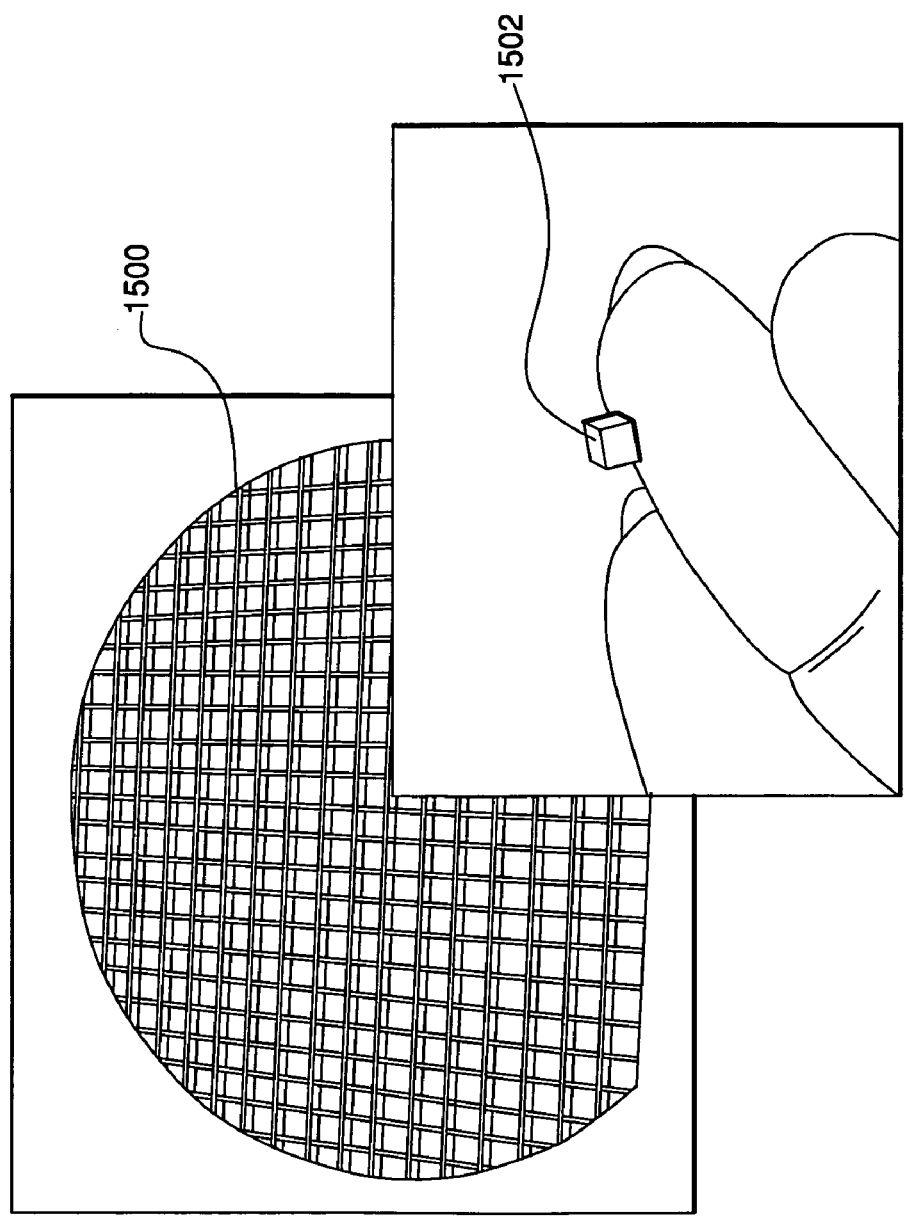
FIG. 15 depicts a method according to the invention for fabricating VBGs.

A first such method, depicted in FIG. 15, exploits the unique property of a hologram, whereupon each fractional piece of the recorded hologram possesses full and complete information about the recorded object. When applied to the VBG filters recorded on the PRG plates, it means that each piece of such plate, or wafer, should have the same filtering properties as the wafer in whole. For that reason, a large-size wafer 1500 can be diced, using a suitable cutting device, such as a saw, for example, into a large number of relatively small individual VBG elements 1502, each with complete filter functionality. In following this process, one could significantly reduce the number of recording and testing operations, thereby reducing the manufacturing costs of the VBG elements.

A second cost-reduction method according to the invention applies to the repetitive fabrication of the filter with identical properties. Such an approach is particularly suitable for high-volume production environments. In such circumstances reproduction of a filter with a complex shape, which may require, for example, multiple exposure steps to achieve the complete control over its spectral shape, may result in a prohibitively long and complex manufacturing operations. However, since holography allows true and complete reconstruction of the recorded wavefront, it is, therefore, possible to record a hologram of the reconstructed wavefront, rather than the true original, to achieve the same result.

This approach includes: a) placing a "virgin" recording wafer directly behind a recorded "master" hologram; and b) directing the reference beam onto the master hologram in exactly the same fashion as during the recording of the master. The transmitted reference wave and the reconstructed object wave interfere again behind the master hologram. Consequently, a new hologram is recorded on the virgin wafer, which is an exact replica of the master.

The advantages of this method include but are not limited to the following: a) better stability (not sensitive to the phase fluctuations); b) simpler setup (no filter shape control required); c) no polishing on the virgin wafer is required, if it is placed in direct contact with the master and an index matching fluid is used on the interface; and d) shorter cycle times (higher throughput).

Methods to Control the Filter Response Function

When used in practical applications such as in fiber-optic devices, for example, the spectral shape of a filter can be used to manipulate the wavelengths of light in a desired fashion. The filter shape can determine such device parameters as adjacent channel isolation, cross-talk, suppression ratio, etc. The ability to control the spectral shape of the VBG filters, therefore, can make the difference between a practically usable device and a practically useless one.

As follows from the general theory of Bragg diffraction (see Kogelnik), the spectral shape of the filter created by a VBG is related via a Fourier transform to the amplitude and phase envelope of the VBG along the general direction of propagation of the affected light wave. It is, therefore, desirable to be able to control both in order to create a filter with a desired spectral shape.

Figure 16A:
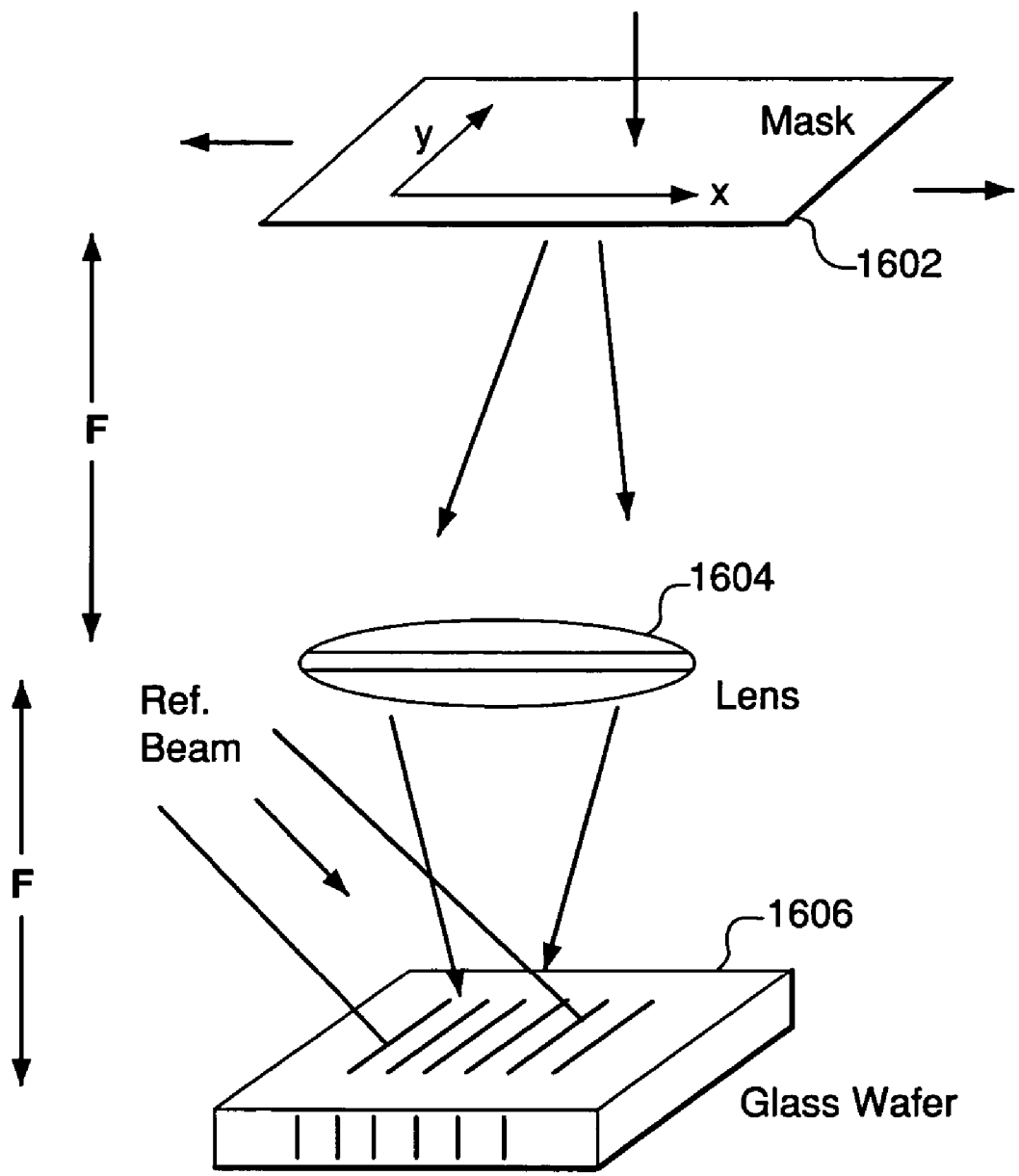
FIGS. 16A–C depict another method according to the invention for fabricating VBGs.

A method according to the invention for controlling the spectral shape of a VBG filter relates to the use of the Fourier transform property of a lens and the phase capturing ability of the holographic recording method. As depicted in FIG. 16A, a method 1600 for creating a VBG filter with any desired spectral shape can be performed as follows. A mask 1602 representing the desired filter shape is placed in the front focal plane of a lens 1604 situated in the object arm of the holographic recording setup. The recording media sample 1606 (e.g., a glass wafer) is placed in the back focal plane of the same lens. The plane-wavefront reference beam of the holographic recording setup overlaps with the object beam on the sample, subtending it at an angle required by the target operational wavelength of the VBG filter being recorded.

When positioned as described, the lens creates a true Fourier transform of the mask directly on the recording medium. Via a coherent interference with the plane reference wave, both the amplitude and the phase of the Fourier transform are transferred to the amplitude and phase envelope of the VBG imprinted on the recording material. When reconstructed, or "read," with a light beam nearly normal to the recorded grating planes, the spectral response of the VBG filter thus recorded will take the shape of the masks placed in the front focal plane of the lens.

This method allows for a single exposure recording of a filter with practically arbitrary complexity of the shape of the spectral response function and is referred to as the "parallel method" or the "holographic filter imprinting method."

A holographic filter imprinting method according to the invention can be similarly applied to the task of shaping the filter response function of transmission VBG filters. It may be accomplished by choosing a proper orientation of the apodizing mask relative to the direction of the grating planes and, similarly, by choosing the proper entrance and exit faces on the VBG element.

Figure 16B:
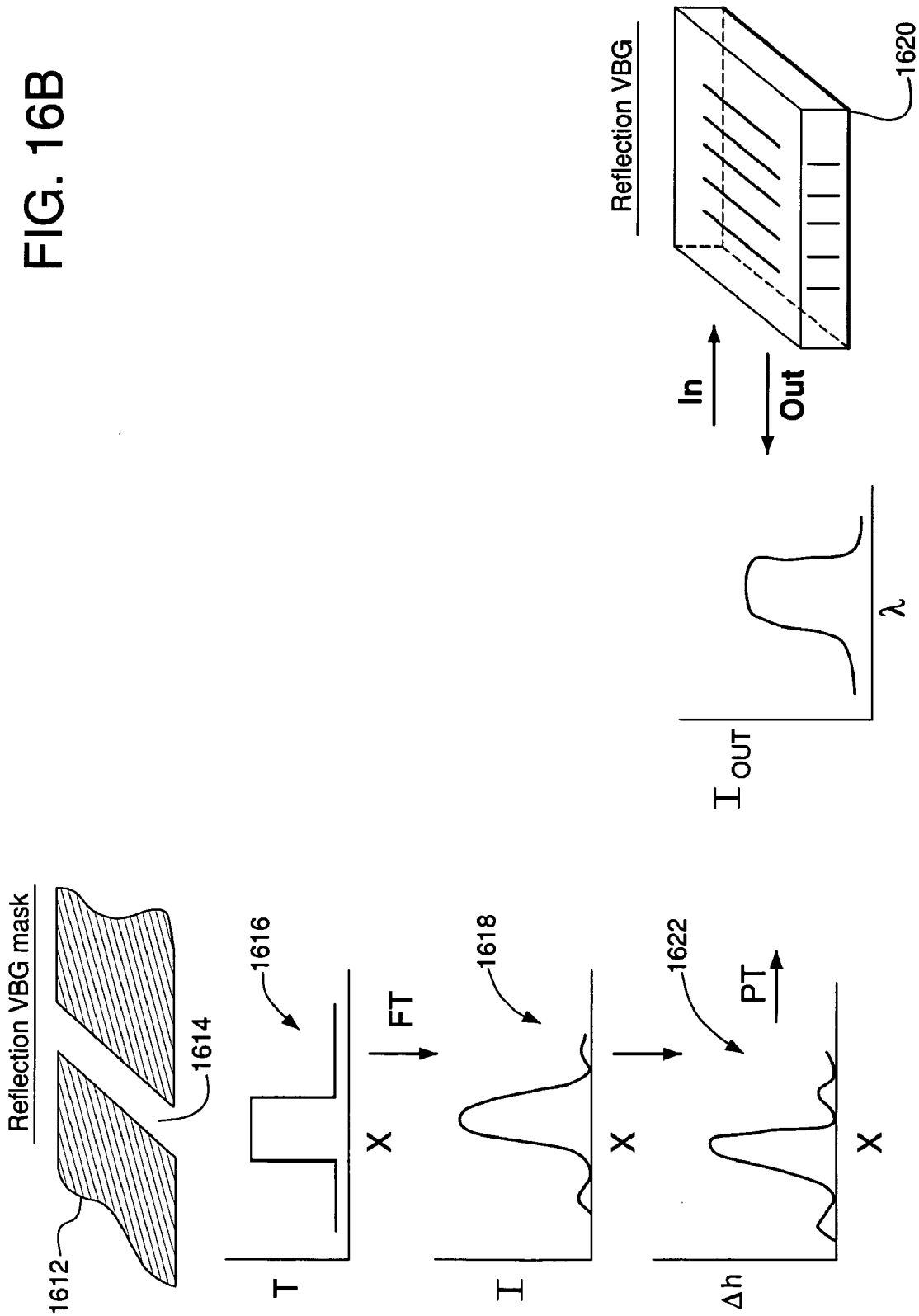
Figure 16C:
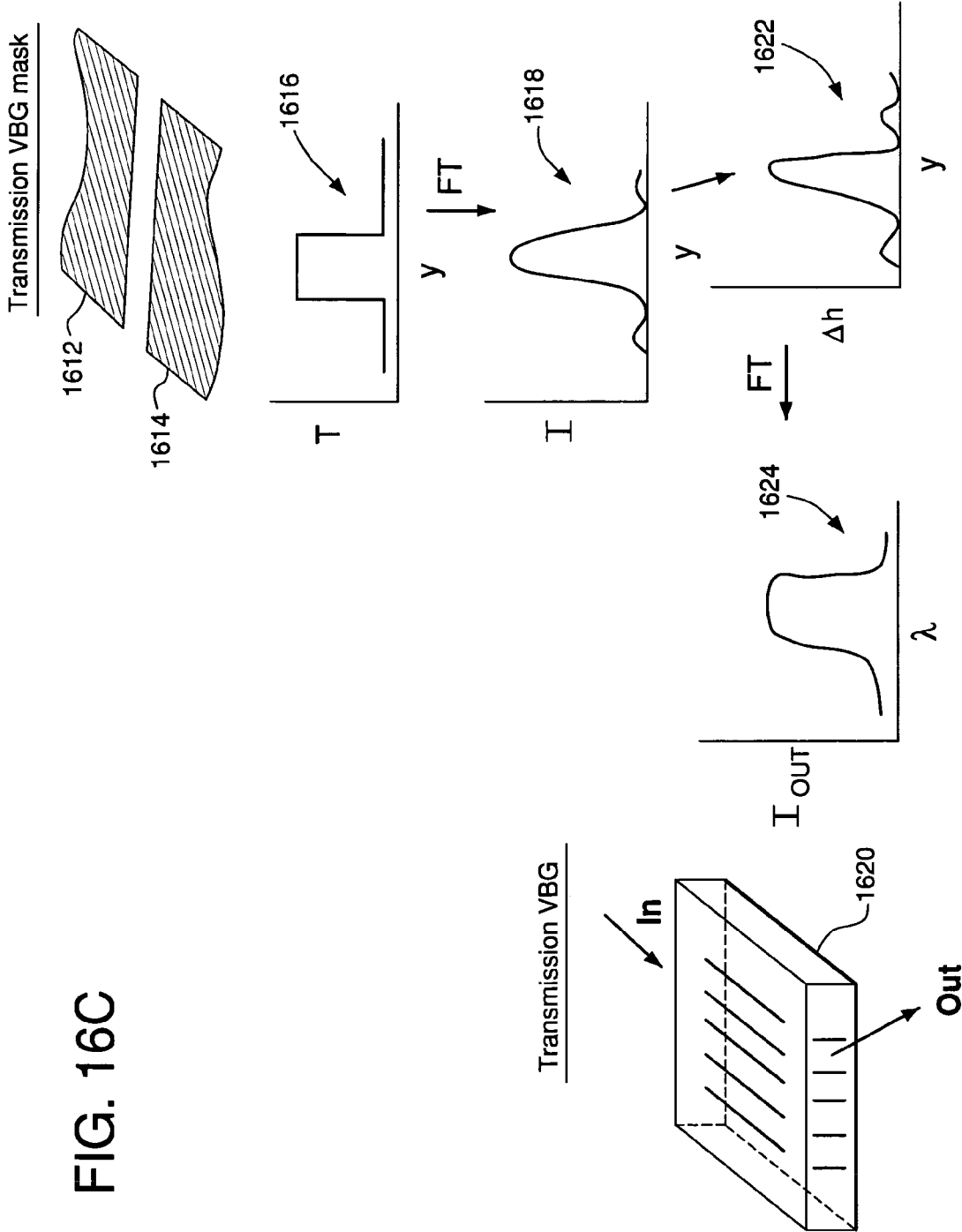

Exemplary methods for creating transmissive and reflective VBGs are depicted in FIGS. 16B and 16C respectively. As shown, a mask 1612 having a slit 1614 can be placed in the front focal plane of the lens. Light shone through the mask will generate a square amplitude profile 1616. As the light passes though the lens, the Fourier transform 1618 of the square amplitude profile will be imprinted on the sample 1620. When reconstructed, the spectral response of the pattern 1622 recorded on the VBG filter 1620 will take the shape of a square amplitude profile 1624. Depending on the orientation of the mask relative to the grating plane, the VBG can be made reflective (as shown in FIG. 16B) or transmissive (as shown in FIG. 16C).

Method for Controlling the Shape of Transmissive VBG Filters

Figure 17:
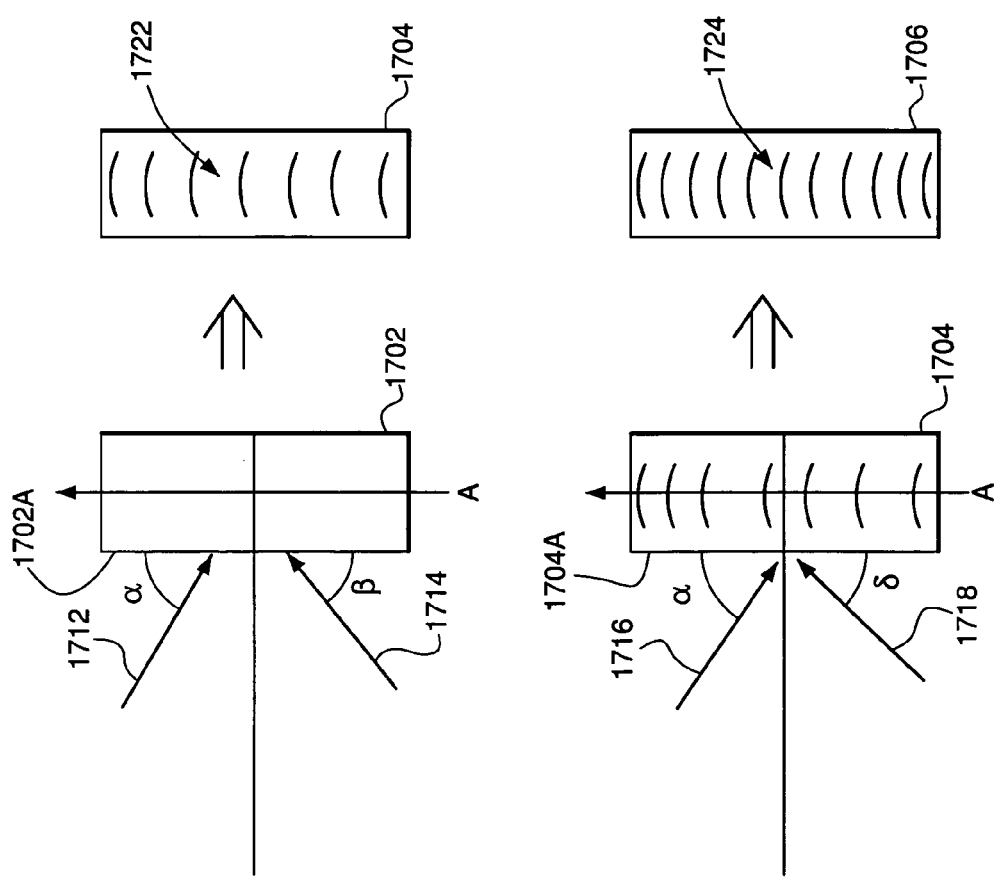
FIG. 17 depicts yet another method according to the invention for fabricating VBGs.

Furthermore, when dealing with VBG filters functioning in the transmission geometry, a different approach can be taken in order to manipulate the spectral shape of the filter. In this case, the method, which is depicted in FIG. 17, comprises multiple, sequential exposures of the same volume of the recording material. Each exposure would produce a simple plane VBG, but after recording multiple gratings a filter of an arbitrary shape will be constructed via coherent addition of the recorded VBGs. Volume Bragg gratings are physical representations of sinusoidal waves, and, therefore, their coherent sum is a Fourier transform of an envelope function.

For that reason, a close representation of an arbitrary amplitude and phase envelope function can be constructed via a series of holographic exposures, provided appropriate control is exercised over both the amplitude and the relative phase of the gratings recorded in such series of exposures. Such control can be achieved via employing techniques for active measurement and stabilization of the phase of the recorded VBGs.

As shown in FIG. 17, a virgin sample 1702 is subjected to a first pair of incident beams 1712 and 1714. Beam 1712 is incident on the entrance face 1702A of the virgin sample 1702 at an angle α relative to the entrance face 1702A (and, as shown, relative to the grating vector A). Beam 1714 is incident on the entrance face 1702A of the virgin sample 1702 at an angle β relative to the entrance face 1702A (and, as shown, relative to the grating vector A). Thus, a first holographic sample 1704 is formed having a first holographic image 1722.

The first holographic sample 1704 is then subjected to a second pair of incident beams 1716 and 1718. Beam 1716 is incident on the entrance face 1704A of the first holographic sample 1704 at an angle γ relative to the entrance face 1704A (and, as shown, relative to the grating vector A). Beam 1718 is incident on the entrance face 1704A of the first holographic sample 1704 at an angle δ relative to the entrance face 1704A (and, as shown, relative to the grating vector A). Thus, a second holographic sample 1706 is formed having a second holographic image 1724.

VBG Chip

Figure 18:
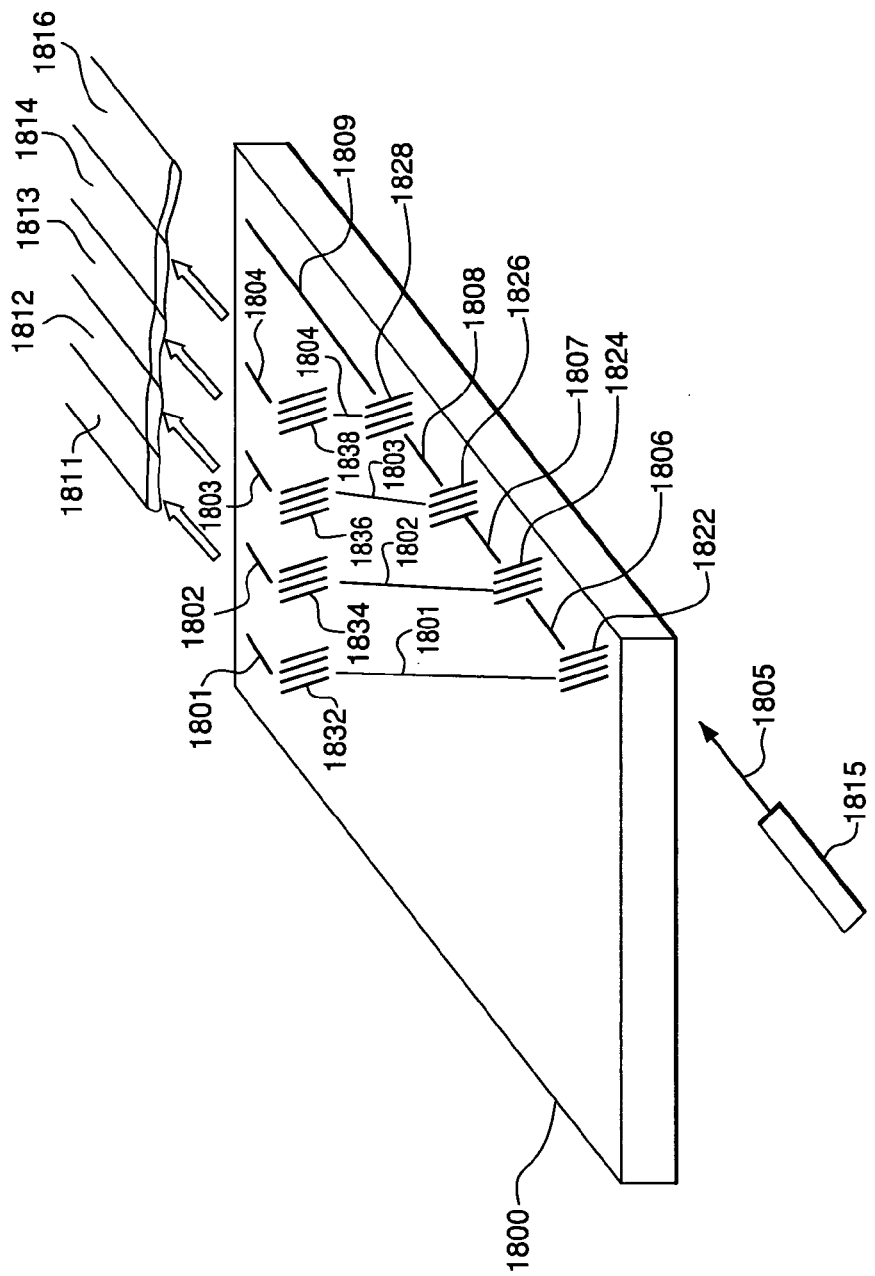
FIG. 18 depicts an integrated VBG "chip" according to the invention.

FIG. 18 depicts an integrated VBG "chip" according to the invention. As shown, the VBG chip 1800 is a monolithic glass structure into which a plurality of holographic images or "gratings" have been recorded. An optical input 1815 carries light 1805 having wavelengths $\lambda_1, \ldots \lambda_N$. Light 1805, which may be collimated, is incident on a first grating 1822. Grating 1822 is recorded such that light 1801 having wavelength $\lambda_1$ is deflected at an angle such that it is received by grating 1832. Grating 1832 is recorded such that it deflects the light 1801 out of the chip 1800 toward an optical receiver 1811. Grating 1822 is transparent to the rest of the wavelengths $\lambda_2, \ldots \lambda_N$ in the input beam 1805, such that a transmitted beam 1806 having wavelengths $\lambda_2, \ldots \lambda_N$ is transmitted through the grating 1822.

The transmitted beam 1806 is incident on grating 1824, which is recorded such that light 1802 having wavelength $\lambda_2$ is deflected at an angle such that it is received by grating 1834. Grating 1834 is recorded such that it deflects the light 1802 out of the chip 1800 toward an optical receiver 1812. Grating 1824 is transparent to the rest of the wavelengths $\lambda_3, \ldots \lambda_N$ in the beam 1806, such that a transmitted beam 1807 having wavelengths $\lambda_3, \ldots \lambda_N$ is transmitted through the grating 1824.

Similarly, the transmitted beam 1807 is incident on grating 1826, which is recorded such that light 1803 having wavelength $\lambda_3$ is deflected at an angle such that it is received by grating 1836. Grating 1836 is recorded such that it deflects the light 1803 out of the chip 1800 toward an optical receiver 1813. Grating 1826 is transparent to the rest of the wavelengths $\lambda_4, \ldots \lambda_N$ in the beam 1807, such that a transmitted beam 1808 having wavelengths $\lambda_4, \ldots \lambda_N$ is transmitted through the grating 1826.

The transmitted beam 1808 is incident on grating 1828, which is recorded such that light 1804 having wavelength $\lambda_4$ is deflected at an angle such that it is received by grating 1838. Grating 1838 is recorded such that it deflects the light 1804 out of the chip 1800 toward an optical receiver 1814. Grating 1828 is transparent to the rest of the wavelengths $\lambda_5, \ldots \lambda_N$ in the beam 1808, such that a transmitted beam 1809 having wavelengths $\lambda_5, \ldots \lambda_N$ is transmitted through the grating 1828. The transmitted beam 1809 is directed toward an optical receiver 1816. As shown, each of the optical receivers 1811–1814 and 1816 can be an optical fiber, for example. Any or all of the optical receivers 1811–1814 and 1816 can be bundled together to form an optical fiber ribbon, for example.

A VBG chip as shown can be made according to the following method. One or more incident beams are directed toward a first location of a virgin sample (to form grating 1822, for example). Then, the beams are turned off, and either the sample or the source of illumination is positioned (e.g., the sample may be moved laterally and/or rotationally as necessary) such that the incident beam(s) may now be directed toward a second location on the sample (to form grating 1824, for example). This process is repeated until all desired gratings have been recorded.

Thus, there have been described fiber optic devices comprising volume Bragg gratings and methods for fabricating the same. Those skilled in the art will appreciate that numerous changes and modifications can be made to the preferred embodiments of the invention, and that such changes and modifications can be made without departing from the spirit of the invention. Examples of devices that can be made in accordance with the invention include, without limitation, 1×N laser source combiners, multi-channel transmit/receive modules (including triplexers), optical add-drop multiplexers, terminal multiplexers, network monitors, wavelength lockers, tunable filters, tunable gain equalizers, dispersion compensators, and the like.

What is claimed:

1. A method for controlling filter response, the method comprising:

providing a mask that corresponds to a desired spectral filter response of a three-dimensional glass element having a Bragg grating recorded therein;

transmitting a signal recording beam through the mask such that the signal recording beam is transmitted through a lens to a recording medium that is sensitive to a wavelength of the signal recording beam, wherein the lens is adapted to perform a spatial Fourier transform of a transfer function associated with the mask such that a Bragg grating that corresponds to a Fourier transform of the desired spectral filter response is recorded on the recording medium.

2. The method of claim 1, further comprising:

transmitting to the recording medium a reference recording beam in combination with the signal recording beam, wherein the reference recording beam has generally the same wavelength as the signal recording beam, such that the signal and reference recording beams are coherent.

3. The method of claim 2, wherein the signal recording beam is incident on a surface of the recording medium, and wherein the reference recording beam is incident on the same surface of the recording medium as the signal recording beam.

4. The method of claim 2, wherein an amplitude and phase of the Fourier transform are transferred to an amplitude and phase of an envelope of the Bragg grating recorded on the recording medium via coherent interference between the signal recording beam and the reference recording beam.

5. The method of claim 1, wherein the recording medium is a sensitized silica glass.

6. The method of claim 1, wherein an amplitude and phase of the Fourier transform are transferred to an amplitude and phase of an envelope of the Bragg grating recorded on the recording medium.

7. A three-dimensional optical element having a desired spectral filter response, the optical element made according to a method comprising:
  providing a mask that corresponds to the desired spectral filter response of the element;
  transmitting a signal recording beam through the mask such that the signal recording beam is transmitted through a lens to a recording medium that is sensitive to a wavelength of the signal recording beam, wherein the lens is adapted to perform a spatial Fourier transform of a transfer function associated with the mask such that a Bragg grating that corresponds to a Fourier transform of the desired spectral filter response is recorded on the recording medium.

* * * * *